(12) United States Patent
Ulmer-Moll et al.

(10) Patent No.: US 8,867,637 B2
(45) Date of Patent: Oct. 21, 2014

(54) METHOD FOR SELECTING A TRANSMISSION MODE

(75) Inventors: Anne-Marie Ulmer-Moll, Rennes (FR); Isabelle Siaud, Rennes (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/517,495

(22) PCT Filed: Dec. 14, 2010

(86) PCT No.: PCT/FR2010/052727
§ 371 (c)(1),
(2), (4) Date: Aug. 2, 2012

(87) PCT Pub. No.: WO2011/083238
PCT Pub. Date: Jul. 14, 2011

(65) Prior Publication Data
US 2012/0307921 A1    Dec. 6, 2012

(30) Foreign Application Priority Data

Dec. 22, 2009    (FR) ..................................... 09 59407

(51) Int. Cl.
*H04K 1/10*      (2006.01)
*H04B 3/54*      (2006.01)

(52) U.S. Cl.
CPC ........ *H04B 3/542* (2013.01); *H04B 2203/5495* (2013.01)
USPC ............ 375/260; 370/203; 370/206; 455/522

(58) Field of Classification Search
None
See application file for complete search history.

(56) References Cited

U.S. PATENT DOCUMENTS

| 4,653,069 | A  | * | 3/1987  | Roeder .......................... 380/31 |
| 7,269,403 | B1 |   | 9/2007  | Miao |
| 7,286,845 | B2 | * | 10/2007 | Boariu et al. ................. 455/522 |
| 2008/0004028 | A1 | * | 1/2008  | Vincent ......................... 455/446 |
| 2009/0262850 | A1 | * | 10/2009 | Catreux et al. ................ 375/260 |

FOREIGN PATENT DOCUMENTS

EP    2028769 A1    2/2009

OTHER PUBLICATIONS

UMA Architecture (Stage 2) R1.04 (May 2, 2005), that is accessible at the address http://www.umatechnology.org/specifications/.
International Search Report and Written Opinion dated Feb. 24, 2011 for corresponding International Application No. PCT/FR2010/052727, filed Dec. 14, 2010.
English translation of the Written Opinion dated Feb. 24, 2011 for corresponding International Application No. PCT/FR2010/052727, filed Dec. 14, 2010.

(Continued)

Primary Examiner — Leon-Viet Nguyen
(74) Attorney, Agent, or Firm — David D. Brush; Westman, Champlin & Koehler, P.A.

(57) ABSTRACT

A method and device are provided for selecting a transmission mode, for a first telecommunications entity having a plurality of different modes for transmitting a communications signal to a second telecommunications entity. The various transmission modes provide the same data rate D. The method includes: for a given transmission mode, determining the value of a first metric $\alpha$ that measures degradation relating to a given distance d stemming from the transmission medium of the communications signal for a given environment compared with a reference model for the transmission medium, as a result of a multi-path effect and/or of an attenuation effect of the transmission medium; and comparing values of the metric $\alpha$ for different modes in order to select at least one transmission mode.

13 Claims, 13 Drawing Sheets

(56) References Cited

OTHER PUBLICATIONS

IEEE P802.11n/D4.01 draft standard for information technology telecommunications and information exchange between systems local and metropolitan area networks—specific requirements, May 2008.
Part 11: wireless LAN medium access control (MAC) and physical layer (PHY) specifications: Amendment 5 (# 933,6171): Enhancements for higher throughput, May 2008.
Magnet (IST FP6) accessible at the Internet address: http//magnet.aau.dk/, Jun. 2006.
High rate ultra wideband (UWB) PHY and MAC standard, 3rd edition, Dec. 2008.
IEEE P802.11n/D4.01 draft standard for information technology telecommunications and information exchange between systems local and metropolitan area networks—specific requirements.
Part 11: wireless LAN medium access control (MAC) and physical layer (PHY) specifications: Amendment 5 (#933,6171): Enhancements for higher throughput, May 2008.
Deliverable D2.5, Oct. 2009 accessible at the Internet address http://www.ict omega.eu/publications/deliverables.html of the European ICT Omega project.
I. Siaud and A.M. Ulmer Moll in the article "Harmonized multi RF band UWB OFDM air interfaces for WPAN applications", MGWS'09 Workshop, Tokyo, Sep. 2009.
IEEE 802.15.3c standard defined in the IEEE P802.15.3c/D07 document "Part 15.3: Wireless medium access control (MAC) and physical layer (PHY) specifications for high rate wireless personal area networks (WPANs): Amendment 2: Millimeter wave based alternative physical layer extension", May 2009 (Two Documents).
Magnet (IST FP6) accessible at the Internet address: http//magnet.aau.dk/.
UMA Architecture (Stage 2) R1.04, that is accessible at the address http://www.umatechnology.org/specifications/ May 2, 2005.
P. Pagani and P. Pajusco "Statistical modeling of the ultra wideband propagation channel through the analysis of experimental measurements", Comptes Rendus Physique de l'Academie de Sciences [Physics Proceedings of the Academy of Sciences], vol. 7, No. 7, pp. 762 773, Sep. 2006.
V. Erceg, L. Shumacher, P. Kyritsi, a. Molish, D.S. Baum, et al. In the document "TGn channel models", IEEE P802.11, IEEE 802.11 03/940r1, Nov. 2003.
French Search Report and Written Opinion dated Aug. 16, 2010 for corresponding French Application No. 09 59407, filed Dec. 22, 2009.

* cited by examiner

METHOD FOR SELECTING A TRANSMISSION MODE

CROSS-REFERENCE TO RELATED APPLICATIONS

This Application is a Section 371 National Stage Application of International Application No. PCT/FR2010/052727, filed Dec. 14, 2010, which is incorporated by reference in its entirety and published as WO 2011/083238 on Jul. 14, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telecommunications. Within this field, the disclosure relates more particularly to so-called "digital" communications. Digital communications include in particular wireless communications; they also include communications by wire, for example. The communications transmission medium is commonly referred to as a transmission or propagation channel, with this term originally referring to a channel over the air and being extended to refer to any channel. By way of example, wired systems may have a power line transmission (PLT) type transmission interface with a wired transmission channel making use of the electrical power network, or an optical transmission interface with a transmission channel that may equally well be "wired" (i.e. make use of optical fiber) or pass through the air, e.g. as output by a light-emitting diode (LED). Wireless systems have a so-called radio frequency (RF) transmission interface in a telecommunications system making use of transmission over the air of a signal occupying a radio band (e.g. of the GMS, UMTS, 802.11x, or 802.16e type).

BACKGROUND OF THE DISCLOSURE

Telecommunications systems are generally structured with an architecture that complies with the layer organization of the open system interconnection (OSI) communications model as standardized by the International Organization for Standardization (ISO).

The OSI communications model defines the management of a data transmission service by means of seven superposed protocol layers: the physical layer (layer 1); the data link layer (layer 2); the network layer (layer 3); the transport layer (layer 4); the session layer (layer 5); the presentation layer (layer 6); and the application layer (layer 7).

The first three layers 1, 2, and 3 are referred to as "low" or "media" layers and they relate to setting up the connection and transporting the data. The following four layers are referred to as "high" or "host" layers and they are responsible for processing data. This organization thus enables the telecommunications system to implement the service associated with the processed data.

The data link protocols satisfy service requests coming from the network layer and they perform their function by sending service requests to the physical layer.

Exchanges of signaling between two communications entities that are joined together by a transmission channel are controlled at data link layer level by means of a frame structure known as medium access control (MAC). With reference to FIG. 1, MAC frames are encapsulated in a frame structure (known as "physical" frames) by the physical layer PHY, prior to being transmitted over the transmission channel.

FIG. 2 shows an example of how a physical frame (PPDU structure) is made up for the single-frame MAC mode of the ECMA-368 standard as defined in the document "High rate ultra-wideband (UWB) PHY and MAC standard", 3rd edition, December 2008. Layer 1, referred to as the PHY layer, is made up of two protocol sublayers: a physical layer convergence protocol (PLCP) layer and a physical medium dependent (PMD) layer. The PLCP layer provides frame synchronization and allocates one or more logic channels (MAP service data unit (MSDU)) coming from the MAC layer at PHY frame level. The PMD layer generates the data field (frame payload). These two layers give rise to a transmission unit, referred to as a PLCP protocol data unit (PPDU), transmitted over the PHY layer. The PPDU has a PLCP preamble, a PLCP header, and a PSDU.

Nowadays, telecommunications systems are seeking flexibility in the PHY/MAC transmission mechanism for the purpose of delivering a given data rate D at a transmitter-to-receiver distance d with a guaranteed quality of service (QoS), which is described at the level of the PHY layer by an optimum binary error rate (BER) referred to as a target BER (BERt). These flexible systems comprise one or more transmission interfaces.

A transmission interface includes the physical layer PHY that encompasses one or more transmission modes and transmission protocols specific thereto (MAC) in order to implement these transmission modes.

The term "transmission mode" is used below to designate a transmission technique (orthogonal frequency division multiplexing (OFDM), multiple-input multiple-output (MIMO) technique (spatial mapping, spatial division multiplex, etc.), spreading, etc.), associated with an error-correcting code scheme (signal binary coding (SBC)) and digital modulation, referred to as a modulation and coding scheme (MCS) which is typically 16-QAM 1/3, 64-QAM 3/4, etc., and also with a transmission bandwidth Bw and with a transmission carrier frequency (optical, RF, etc., possibly having a value of zero) enabling the signal to be generated in a spectrum band that is dedicated to transmitting the signal (base band, radio band, infrared band, optical band) and delivering a data rate D.

The data rate D is calculated on the data field, usually referred to as the data payload or the frame payload, that is incorporated in a PSDU, and it does not take account of the frame format at MAC layer level.

Thus, in order to deliver a certain data rate D with a quality of service QoS over a distance d, it is possible, in a so-called "flexible" telecommunications system, to select one transmission mode from a plurality for a given communications unit.

A communications entity may equally well be a mobile terminal or a fixed terminal or any type of access point to an access network.

Selection is thus based on the transmission mode that is best suited for guaranteeing a data rate D and a QoS over a distance d.

The preamble of the PPDU is dedicated to frame synchronization and to other functions. It is made up of a sequence for synchronizing the two communicating entities that seek to communicate and it is specific to the protocol of the MAC layer. For a system of the ECMA-368 type, known as "Wi-Media/ECMA-368", the preamble also includes OFDM symbols dedicated to estimating the propagation channel.

The PHY header or the PLCP header of the PPDU gives the characteristics of the associated transmission mode to the transmission interface j under consideration, information relating to the size of the frame payload data field in the PSDU, the MAC transmission mode (whether or not the data field is fragmented into subframes (burst mode)), the sequencing of the subframes, information associated with the link (transmitter-to-receiver distance, radiated power, etc.), and other characteristics. This transmitted data is protected using codes (Reed Solomon code for an ECMA-368 system). Tail bits and pad bits are used to reinitialize the coder specified in the PLCP header.

The PSDU contains, in particular, the information that is to be transmitted (frame payload), which information is associated with one or more transmission modes of the transmission interface j. The PSDU corresponds to the data field and may be made up of one or more MSDUs or it may be a fragmentation thereof.

For a PSDU made up of an MSDU, the PSDU contains, in particular, the information for transmitting at the data rate D for a given transmission mode, and the MAC protocol data unit (MPDU) protocol at the level of the MAC layer controls synchronization of the transmission of the PHY frame formed of an MSDU.

For a PSDU made up of a plurality of MSDUs, the MSDUs are fragmented in subframes. Under such circumstances, the MAC transmission mode is said to be burst mode. The MAC layer controls only the first or "synchronization" frame, the other frames are controlled at PHY layer level. Additional fields are added both in the PLCP header and in the PSDU in order to manage this fragmentation of the MSDUs and how they are distributed over a plurality of subframes. These various MSDUs may comprise a plurality of transmission modes of the transmission interface j. The frame that is built up is referred to as a superframe.

The PSDU may be associated with a frame check sequence (FCS) and by bits known as tail bits for reinitializing the channel coder (associated with the transmission mode). Pad bits ensure that the frame is of a size that is compatible with the MAC frame format.

The following examples of communications entities may be said to be "flexible"; they have one or more transmission interfaces respectively associated with one or more transmission modes.

The first example relates to a communications entity that has transmission interfaces compatible respectively with a MIMO IEEE802.11n system, with a SISO UWB-OFDM system (Wi-Media/ECMA-368), and with a UWB-OFDM system at 60 gigahertz (GHz) with transmission modes that make it possible to obtain the same target data rate, given in this example to within about 3%, associated with an upper limit of about 8% in maximum value, making it possible to select various transmission modes.

A MIMO IEEE802.11n system as defined in the document "IEEE P802.11n™/D4.01 draft standard for information technology telecommunications and information exchange between systems—local and metropolitan area networks—specific requirements—Part 11: wireless LAN medium access control (MAC) and physical layer (PHY) specifications: Amendment 5 (#933,6171): Enhancements for higher throughput, May 2008", with a MIMO configuration having four space-division streams making it possible to achieve a data rate of 540 megabits per second (Mbit/s) (Appendix 1, paragraph 4.1 of the IEEE document) for the data field (PSDU).

A SISO type UWB-OFDM system defined in the Wi-Media/ECMA-368 standard makes it possible to achieve a data rate lying in the range 53 Mbit/s to 480 Mbit/s.

A UWB-OFDM system at 60 GHz (e.g. a system derived from the ECMA-368 standard transferred to 60 GHz associated with digital modulation having a larger number of states and with a broader transmission band, as described in the document "Deliverable D2.5, October 2009" accessible at the Internet address http://www.ict-omega.eu/publications/deliverables.html of the European ICT Omega project), or for example the UWB-OFDM system described by the authors I. Siaud and A. M. Ulmer-Moll in the article "Harmonized multi-RF band UWB-OFDM air interfaces for WPAN applications", MGWS'09 Workshop, Tokyo, September 2009, or indeed a system of the IEEE 802.15.3c standard defined in the IEEE P802.15.3c/D07 document "Part 15.3: Wireless medium access control (MAC) and physical layer (PHY) specifications for high rate wireless personal area networks (WPANs): Amendment 2: Millimeter-wave based alternative physical layer extension", May 2009, makes it possible to achieve a data rate of several Gbit/s, depending on the channel selected.

Depending on the radiated transmission power level, the radio coverages of the 802.11n system are close to those of WPAN systems (short-range network: distance d (range)<20 meters (m)) using a UWB-OFDM transmission technique.

In order to establish communication between two communicating entities complying with the first example and spaced apart by a distance d, while guaranteeing a data rate D and a target binary error rate BERt representative of a given quality of service QoS, the problem arises of knowing what criterion to use for selecting a transmission mode.

Selection by data rate discrimination (or data rate selection) is described in the documents prepared in the context of a European project known as MAGNET (IST-FP6) accessible at the Internet address: http//magnet.aau.dk/. That selection acts between two transmission modes, one transmission mode associated with an interface I1 of the UWB type delivering data rates of about 250 kilobits per second (kbit/s) (UWB-FM technique), and the other transmission mode, associated with an interface I2 of the multi-carrier type with spreading in the frequency domain by means of codes (multi-carrier spread spectrum (MC-SS) technique) delivering data rates lying in the range 1.8 Mbit/s to 130 Mbit/s operating at 5.2 GHz, implemented in a given communications entity Pnc, Dev.

That transmission mode selection is managed in the IST-FP6 MAGNET system at the level of a layer common to both transmission modes and referred to as the universal convergence layer (UCL). FIG. 3 is a diagram of the makeup of an IST-FP6 MAGNET system. The convergence layer UCL is situated immediately above the protocol layer (MAC) of each of the transmission interfaces I1 and I2, and it generates the messages of exchanges between a first communications entity, a transmitter Pnc, and a plurality of second communications entities, receivers Dev, in order to establish communications with a given interface.

A communications entity may equally well be a transmitter and/or a receiver.

Such selection by data rate discrimination is appropriate when the data rates are very different, however when the transmission modes deliver data rates that may be equivalent, such selection is not satisfactory.

By way of example, mention may be made of a communications entity comprising transmission interfaces that are compatible respectively with a UWB-WiMedia (ECMA-368) system, with an MC-SS system of the MAGNET European project, and with an IEEE802.11n system, all of which cover common ranges of data rates for a given distance d and a given WLAN/WPAN deployment scenario (where a wireless local area network (WLAN) has a distance d (range) close to 150 m in open space, while a wireless personal area network (WPAN) has a distance d (range) close to 15 m to 20 m). A propagation scenario is usually described by a radio coverage range that is typically less than 20 m for the WPAN scenario, a multiple-path channel model, and a corresponding attenuation model. These various models may be different depending on the transmission bandwidth of the transmission mode under consideration.

The MC-SS system of the MAGNET European project, shown in FIG. 4, relies on a spread spectrum transmission technique applied in the frequency domain followed by OFDM modulation. The data rate depends on modulating data symbols (digital modulation or signal binary coding) and on the error correcting coding rate, on the number of spreading codes implemented, and also on the transmission bandwidth (20 megahertz (MHz) or 40 MHz channels), i.e. on the number of data symbols transmitted simultaneously by the OFDM modulation implemented downstream from the spreading process. The system transmits at a carrier frequency equal to 2.4 GHz or 5.2 GHz. FIG. 5 illustrates the various data rates D that can be obtained for different transmission modes associated with a transmission interface of the MC-SS type for a MAGNET system. The circles and squares in FIG. 5 correspond to the different modes that enable the following to be obtained respectively: either a data rate at 40 Mbit/s to within about 3%, or else a data rate of 80 Mbit/s to within about 3% with an upper limit of about 8%. The data rate D that is obtained is proportional to the load on the system (load equal to the number Nc of spreading codes implemented divided by the size Lc of the spreading code), to the size of the transmission band via the number of data symbols spread per OFDM symbol and the modulation and coding scheme (MCS). Depending on the number Nc of the spreading codes implemented, the data rate is given by:

$$D = \frac{N_{BPSC} \cdot r \cdot N_{SD}}{Tsymb} \cdot \frac{Nc}{Lc} \quad (1)$$

where $N_{BPSC}$ is the number of bits per data symbol, $N_{SD}$ is the number of symbols per OFDM symbol dedicated to transmission, Tsymb is the duration of the OFDM symbol, and r is the error correcting coding rate.

The granularity of the data rate for each modulation and coding scheme (MCS) is given by the data rate delivered by the system when only one code is implemented (Nc=1). Table A.1 in Appendix A gives the data rate values D of an MC-SS MAGNET system obtained as a function of the transmission mode for a load Nc/Lc=Nc/8. The data rate values shown in FIG. 5 correspond to the values of Table A.1 for Nc=8 or Nc=4. The transmission modes that deliver a data rate of 40 Mbit/s (±3%) are those that coincide with the line for data rate D=40 Mbit/s, and that are surrounded by a round shape in FIG. 5. The transmission modes that deliver a data rate of 80 Mbit/s (±3%) are those that coincide with the line for data rate D=80 Mbit/s and that are surrounded by a square in FIG. 5.

The Wi-Media/ECMA-368 system shown in FIG. 6 relies on OFDM modulation in a 528 MHz channel associated with a frequency hopping method applied to successive OFDM symbols. This method makes use of a hopping pattern referred to as a time-frequency coder (TFC) as shown in FIG. 6. The TFC method is applied on a "band-group" made up of three adjacent RF channels using a pattern that takes six OFDM symbols into account. Fourteen RF channels are defined in the {3.1-10.6} GHz band. Two redundancy techniques are implemented at data symbol scale and they are designated in the standard by spreading technique.

The frequency spreading (FS) technique consists in duplicating the symbols on either side of zero frequency in the OFDM multiplex using Hermetian symmetry. This generates a real signal at the output from the OFDM modulator.

The time spreading (TS) technique consists in transmitting the same OFDM symbol twice over different channels given by the TFC hopping pattern. This gives rise to pseudo-diversity resulting from the different RF channels used to transmit the same OFDM symbol.

Each of these two spreading techniques divides the data rate by two. When they are combined with each other, they divide the data rate by four.

The types of digital modulation (signal binary coding) under consideration are quadrature phase-shift keying (QPSK) or dual carrier modulation (DCM) in which each symbol is made up of two bits. The data rate D obtained for the various transmission modes of the (Wi-Media) ECMA-368 system is shown in FIG. 7 with the transmission mode being plotted along the abscissa axis and identified by the type of digital modulation, together with the correcting code rate and with the spreading technique (e.g.: QPSK-1/3-TS+FS).

The high throughput (HT) modes of the IEEE802.11n system shown in FIG. 8 rely on a SISO/MIMO-OFDM technique consisting in parallel use of binary transmission over a plurality of transmission streams Flux_T that are sent to distinct transmit antennas. The data for transmission is demultiplexed. When demultiplexing is performed on the code bits, the various transmission streams output by the demultiplexer are referred to as spatial streams written Flux_S. For the IEEE802.11n system, the number of spatial streams Nss varies from one to four. The number of spatial streams and an increase in the transmission band width (20 MHz or 40 MHz) enable the transmission data rate to be increased by using parallel transmission over a plurality of OFDM transmission systems as shown in FIG. 8. Each transmission system comprises OFDM modulation performed with a transmission channel of variable size (20 MHz or 40 MHz), a MIMO technique, and a modulation and coding scheme specific to each spatial stream (Nss) (in general the scheme is identical for all of the spatial streams). The system transmits at a carrier frequency equal to 2.4 GHz or else to 5.2 GHz.

For the IEEE802.11n system of FIG. 8, the data rate D obtained for the various transmission modes, written $MCS_{11n}$ in the document of the standard, is shown in FIG. 9 where transmission mode is plotted along the abscissa axis and identified by the type of digital modulation MOD and the correcting code rate COD (e.g.: QPSK-1/2), with this applying to a Tcp=800 nanoseconds (ns). In this standard, $MCS_{11n}$ transmission modes are numbered as a function of the modulation and coding scheme MCS and as a function of the number Nss of spatial streams implemented.

The 802.11n system may implement so-called space-time coding techniques. These do not modify the data rate, but they give rise to spatial redundancy between the spatial $N_{SS}$ streams, thereby increasing the number of transmission streams output by the block STBC. The streams as formed in this way are referred to as space-time streams.

The values obtained for the data rate D as a function of the transmission mode are given in Table C.1 of Appendix C.

Given that the definition of the transmission mode in the meaning of the invention includes the parameter set for a MIMO technique and for the associated coding (space division multiplexing (SDM), Alamouti space time block coding (STBC), etc.), which means that a given $SCM_{11n}$ of an IEEE802.11n system covers a plurality of transmission modes in the meaning of the invention. For example, a configuration comprising a MIMO technique of the SDM type in which the space streams are not subjected to any space-time coding ($Nss=N_{STS}=N_{TX}$) as shown in FIG. 10, and a configuration comprising an STBC technique as shown in FIG. 11 gives rise to data rates that are identical and that are referenced in identical manner and covered by the same $SCM_{11n}$ in the IEEE802.11n standard. In the definition of transmission mode in the meaning of the invention, these two configurations correspond to two distinct transmission modes that are distinguished by the MIMO technique and the associated coding that are implemented.

The three above systems may operate in the same frequency band. The IEEE802.11n system shown in FIG. 8 operates over the 2.4 GHz and 5.2 GHz RF channels. The MC-SS system of the MAGNET European project shown in FIG. 4 uses the RF channels of the IEEE802.11n system. The Wi-Media/ECMA-368 system shown in FIG. 6 transmits in the {3.1-10.6}GHz band.

In order to deliver a data rate D of about 80 Mbit/s, the communications entity that includes transmission interfaces compatible respectively with a UWB-WiMedia (ECMA-368) system, with an MC-SS system of the MAGNET European project, and with a IEEE802.11n system may have their parameters set in different ways:
  selecting a transmission mode associated with the Wi-Media/ECMA-368 system with a transmission bandwidth of 528 MHz (507.375 MHz of effective bandwidth) in the {3.1-10.6}GHz band may have the following parameter settings: QPSK 1/2 modulation associated with the time spreading (TS) and frequency spreading (FS) method of the standard (Appendix 1); or
  selecting a transmission mode associated with the MAGNET MC-SS system having its parameters set as follows: 16-QAM 3/4 or else 16-QAM 2/3 or indeed 64-QAM 1/2 at full load (Nc/Lc=1) operating at 2.4 GHz or at 5.2 GHz for a 40 MHz band; or
  selecting a transmission mode associated with the IEEE802.11n system operating either at 2.4 GHz or at 5.2 GHz with its parameters set as follows: $SCM_{11n}$\{TQPSK-3/4, Nss=2, Bw=40 MHz\} or $SCM_{11n}$\{QPSK 3/4, Nss=4, Bw=20 MHz\} or $4SCM_{11n}$\{16-QAM 3/4, Nss=1, Bw=40 MHz\} or $SCM_{11n}$\{16-QAM 3/4, Nss=2, Bw=20 MHz\}, where Nss corresponds to the number of space streams implemented (FIG. 8).

It can consequently be seen that selecting the most appropriate transmission mode as a function of a data rate discrimination criterion does not work in this example and does not work in the more general situation where different transmission modes enable the imposed data rate constraint D to be achieved; consequently, data rate cannot be used as a selection criterion under such circumstances.

The power required for delivering a data rate D is known as possibly constituting another selection criterion, in particular for a UNIK® system from the supplier Orange France via the RSSI parameter. The UNIK® system dedicated to voice systems is a system operating with the WiFi technique (Bluetooth, IEEE802.11) and it can switch over to GSM when the received power is below a certain threshold. This threshold is defined by each manufacturer and is referred to as the RSSI parameter. The RSSI parameter is an integer lying in the range 0 to Nmax−1. It corresponds to quantifying the received power between two threshold values with a received power variation margin as specified by each manufacturer. This power is measured at the receiver. In terms of real power value, the RSSI parameter is at least greater than the sensitivity threshold of the system and is accompanied by a greater margin associated with the degradation introduced into the propagation channel by multiple paths.

The mechanisms for switching over between the WiFi technique and the 3G technique are specified in the unlicensed mobile access (UMA) standard defined in the document UMA Architecture (Stage 2) R1.04 (2005-5-2), that is accessible at the address http://www.umatechnology.org/specifications/. The UMA standard has a UMA network interface known as a network controller NC and referenced UNC, which controller manages the switching over and the requests at IP network level in order to allocate a resource to the terminal (MS) when the terminal switches over to the 3G system. While the terminal is in the 3G cell, it switches back to the WiFi technique as soon as it finds itself within range of a WiFi access point and providing authentication is possible and the RSSI criterion is satisfied. In the UMA standard (layer 2) in Appendices A and B, minimum received and transmitted power values are given for each WiFi technique and typical antenna gains in transmission and in reception are also given, for the access point and for the terminal.

This required power criterion is unsatisfactory since its range of variation can be completely different from one system to another, e.g. as a function of the manufacturer of the system, of the technology used by the transmission interface (optical, electromagnetic, wired, etc.), of the frequency bandwidth of the system (UWB, etc.), . . . .

Known mechanisms for selecting a transmission mode that is most suitable for guaranteeing a data rate D, a quality of service QoS, and a range d for a communications entity having a plurality of transmission modes are not satisfactory, given that the various criteria used do not enable selection to be performed under all circumstances, in particular for the above-described communications entities.

SUMMARY

An embodiment of the invention proposes a technique serving to improve the selection of a suitable transmission mode for guaranteeing a data rate D, a quality of service QoS, and a range d for a communications entity having a plurality of different transmission modes.

An embodiment of the invention thus provides a method of selecting a transmission mode, for a first telecommunications entity having a plurality of different modes for transmitting a communications signal to a second telecommunications entity, the various transmission modes providing the same data rate D. The method comprises:
  a step for a given transmission mode of determining the value of a first metric $\alpha$ that measures degradation relating to a given distance d stemming from the transmission medium of the communications signal for a given environment compared with a reference model for the transmission medium, as a result of a multi-path effect MCM and/or of an attenuation effect of the transmission medium NBCM; and
  a step of comparing values of the first metric $\alpha$ for different modes in order to select at least one transmission mode $Mode_i$.

An embodiment of the invention also provides a communications entity having at least two different transmission modes.

Thus, a communications entity of an embodiment of the invention comprises:

- a determination module for acting for a given transmission mode to determine the value of a first metric α that measures a relative degradation relating to a given distance d stemming from the transmission medium of the communications signal for a given environment compared with a reference model of the transmission medium, as a result of a multi-path effect MCM and/or of an attenuation effect of the transmission medium NBCM; and
- a comparison module for comparing the values of the metric for different modes in order to select at least one transmission mode.

Thus, using a reference metric α of value that does not depend directly on the technology of the transmission interface associated with the given transmission mode makes it possible to compare the values that are obtained for the metric α, since the metric has a range of variation that is common to the various transmission modes, in particular regardless of the power received by the second entity.

A method and an entity of an embodiment of the invention are thus particularly advantageous since they make it possible to select a transmission mode regardless of the technologies implemented by the associated interfaces. In particularly advantageous manner, the expression for the metric α eliminates components specific to the communications signal that correspond to a carrier frequency associated with transmission of the RF, optical, or wired type, in particular, and provides a common range of variation regardless of the received power level.

Consequently, a method and a communications entity of the invention makes it possible more particularly to an embodiment of compare the transmission modes associated respectively with different transmission carrier frequencies of the communications signal, with the implication that these frequencies are associated with different communications interfaces, e.g. of the radio, optical, or PLT type, by comparing the various values of the metric as calculated for each of these modes. The selection goes to those transmission modes for which the value of the metric satisfies a threshold criterion. Typically, consideration is given only to those transmission modes for which the value of the metric is greater than a threshold for a given distance d that generally corresponds to the distance between the first and second telecommunications entities.

In a preferred implementation of an embodiment of the invention, the first metric α is the result of a weighted sum of degradation associated with the multi-path effect MCM and of degradation associated with the effect of attenuation of the transmission medium NBCM.

By appropriately selecting the weighting values, the weighting makes it possible to limit performing calculations pointlessly, typically when only one of the multiple-path or transmission medium attenuation effects is perceptible, given the environment of the two communicating entities.

In a preferred implementation of an embodiment of the invention, the multi-path effect MCM is determined by taking the difference between a multi-path sensitivity threshold of the transmission mode and a sensitivity threshold of the transmission mode, the sensitivity threshold corresponding to a minimum power required for ensuring a data rate D with a target BER representative of the QoS for a Gaussian transmission medium.

In this implementation, it is simple to measure the multiple-path effect since it is the result of taking the difference between two values that are generally accessible in the form of curves in the technical documentation associated with an entity.

In a preferred implementation of an embodiment of the invention, the method further comprises, for the selected transmission modes:

- a step of determining the value of a second metric β that measures the non-normalized excess power available at the distance d, i.e. the difference between the available power and the required minimum power; and
- selecting a transmission mode for which the second metric β exceeds a given threshold.

In this implementation, the method determines a second metric β that takes account of the power excess between the power available and the power required. This mode is particularly advantageous since it makes it possible to check that the selected mode delivers sufficient power that exceeds the sensitivity threshold of the second entity. In the event of none of the modes providing sufficient power to exceed the threshold, that means that the second entity is outside the coverage of the first entity. After the transmission mode has been selected, the method may adjust the power that is radiated as a function of the power excess as measured by the second metric.

In a preferred implementation of an embodiment of the invention, the method consists in repeating a selection method as specified above for different distances $d_j$.

This implementation serves to cover a plurality of distances.

In a preferred implementation of an embodiment of the invention, the second metric β is calculated using the following equation:

$$\beta = Gr + EIRP - \alpha - S - PL_{FS}(d)$$

where EIRP is the radiated power output by the transmit antenna of the transmitter entity, Gr is the gain of the receive antenna, S is the minimum power required for ensuring the data rate D with a given QoS for a Gaussian channel, and $PL_{FS}(d)$ is the propagation attenuation in free space.

In a preferred implementation of an embodiment of the invention, the method further comprises a step of transmitting a dedicated preamble frame that comprises sequences dedicated to estimating the transmission medium for at least two different transmission modes.

This method makes it possible in simple manner to measure the degradation associated with the multiple-path effect in a manner that is quasi-simultaneous for the various candidate transmission modes for selection.

In a preferred implementation of an embodiment of the invention, the method further comprises updating the values of the first and second metrics α, β from an estimate of the transmission medium performed on the data (PSDU field) transmitted by the communications signal between these two entities.

This implementation enables the values of the metrics to be updated almost in real time since it is performed on the basis of the data field of a data frame. This updating makes it possible in particularly advantageous manner to be able to adjust the transmission mode that is selected to variations in the environment. Such variations may occur when one of the telecommunications entities is on the move. This implementation is thus advantageous since it ensures that the selection method operates dynamically.

In a preferred implementation of an embodiment of the invention, for a transmission mode being associated with a transmission interface the method further comprises:

triggering the sending of a dedicated preamble frame comprising sequences dedicated to estimating the transmission medium for at least two transmission interfaces of the system as soon as the updated value of the first metric α departs from a given range $$\alpha_{min} < \alpha_j < \alpha_{max}$$

and the mode selected from the updated second metric β is associated with a transmission interface distinct from that associated with the previously selected mode.

As a function of variations in the surroundings, the value of the metric α may vary significantly and cross threshold values that have been fixed, e.g. as a result of simulations. Detecting such threshold crossings and the change of interface causes a dedicated preamble frame to be triggered, thereby making it possible to measure the metric for various modes and thus possibly select a different transmission mode. This embodiment is thus advantageous since it ensures that the selection method operates dynamically and enables the selection of transmission mode to adapt to variations in the surroundings without any action being taken by an operator.

In a preferred embodiment of an embodiment of the invention, the communications entity includes a plurality of transmission interfaces, the transmission modes being associated with respective transmission interfaces, such as transmission interfaces belonging to a list comprising:

an interface of the PLT type;
an interface of the RF type; and
an interface of the optical type.

The various above implementations may optionally be combined with one or more of these implementations to define other implementations.

An embodiment of invention also provides a telecommunications system having multiple transmission modes and that is adapted to implement a method of an embodiment of the invention.

Thus, a telecommunications system of an embodiment of the invention comprises a communications entity of the invention.

In a preferred implementation, the steps of the selection method of an embodiment of the invention are determined by program instructions incorporated in an electronic circuit such as a chip that may itself be arranged in an electronic device such as a communications entity. The selection method of an embodiment of the invention may equally well be implemented when the program is loaded into a calculation member such as a processor or the equivalent so that its operation is then controlled by executing the program.

Consequently, an embodiment of the invention also applies to a computer program, in particular a computer program in or on a data medium and suitable for implementing an embodiment of the invention. The program may make use of any programming language and may be in the form of source code, object code, or of code intermediate between source code and object code such as in a partially compiled form, or in any other desirable form for implementing a method of an embodiment of the invention.

The data medium may be any device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Alternatively, the data medium may be an integrated circuit in which the program is incorporated, the circuit being adapted to execute or to be used in the execution of the method in question.

Furthermore, the program may be translated into a transmissible form such as an electrical or optical signal, suitable for being conveyed via an electrical or optical cable, by radio, or by other means. The program of an embodiment of the invention may in particular be downloaded from a network of the Internet type.

BRIEF DESCRIPTION OF THE DRAWINGS

Other characteristics and advantages appear from the following description of particular examples made with reference to the accompanying Figures that are given as non-limiting examples.

DETAILED DESCRIPTION OF ILLUSTRATIVE EMBODIMENTS

Figure 1:
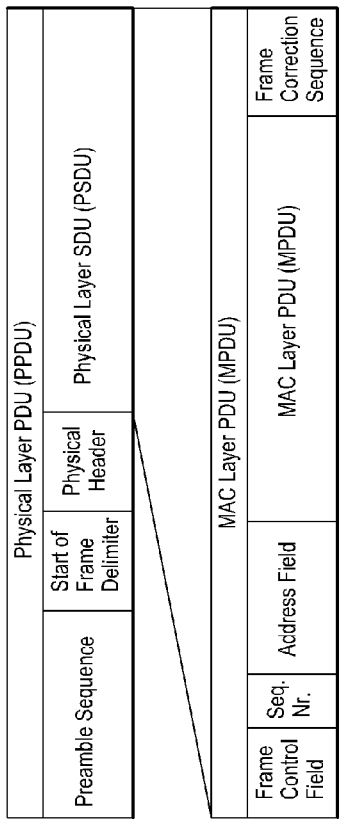
FIG. 1 is a diagram of the structure of a frame of the physical layer of level 1 and of the corresponding frame of the MAC layer of level 2, with reference to the OSI model.

The selection method of an embodiment of the invention makes use of a metric α for comparing the performance as obtained using the different transmission modes, each mode being associated by definition with a transmission interface that may be identical and/or different amongst the various modes.

The metric α measures the relative degradation introduced by the transmission channel for a given telecommunications entity in a given environment compared with a reference model for the transmission medium, taking account both of the multi-path effect and also of the attenuation of the propagation channel (PL(d)).

The metric α is typically the result in decibels (dB) of a weighted sum of a multi-path channel (MCM) degradation associated with the multi-path effect and of a narrow band channel (NBCM) degradation associated with the effect of attenuation by the transmission medium.

The effect of multiple paths in the propagation channel has an impact on performance at the level of the physical layer (radio performance) compared with transmission over a so-called "perfect" channel. The multi-path effect gives rise to relative degradation that limits the reliability of the link for a given transmission mode. This degradation is measured by the difference in dB between the multi-path sensitivity threshold $S_M$ of the given transmission mode and the sensitivity threshold S of the same mode at the same data rate. This measurement is referred to as the multi-path channel margin (MCM). This MCM parameter is used for comparing the performance of various transmission modes at link level.

The multi-path sensitivity threshold $S_M$ of a transmission mode for a propagation scenario is the minimum power required for ensuring a transmission data rate D with a target BER (QoS) when the propagation channel has multiple paths. The multiple-path sensitivity threshold depends:
  on the signal-to-noise ratio required for the transmission mode to reach a data rate with a target BER associated with the QoS (where the BERt is typically $10^{-5}$); and
  on the thermal noise Pb.

The thermal noise Pb is expressed in dBm (decibels relative to one milliwatt) and describes the imperfections of the components of the RF stages of a communications entity. This thermal noise Pb presents variations that are very different from one transmission mode under consideration to another as a function of the transmission bandwidth, of the noise temperature T of the receiver, and of the spectral efficiency. Thermal noise Pb is often expressed as a function of a reference value Pb0 that is equal to −114 dBm, corresponding to a reference noise temperature T0 set at 290 kelvins (K) and to a transmission bandwidth of 1 MHz. The contribution of thermal noise is given by:

$$P_b = 10 \cdot \text{Log}(kTB_w) + L_0 = \qquad (1)$$
$$10 \cdot \text{Log}(kTo) + 10 \cdot \text{Log}\left(\frac{T}{T0}\right) + 10\text{Log}(Bw) + L_0$$
$$P_b = -114 \text{ dBm} + 10 \cdot \text{Log}_{10}(Bw_{MHz}) + NF + L_0(\text{dBm})$$

-continued $$P_b = -114 \text{ dBm} + 10 \cdot \text{Log}_{10}(D) - 10 \cdot \text{Log}_{10}(\textit{Eff}) + NF + L_0(\text{dBm})$$

$$\textit{Eff} = D/Bw$$

with T being the noise temperature of the communications entity, NF being the noise factor (NF=10*Log$_{10}$(T/T0)), Bw being the effective bandwidth of the transmission mode, $L_0$ being the wiring losses, k being Boltzmann's constant, and Eff being the spectral efficiency of the transmission mode. The sensitivity threshold S does not depend on the transmitted power, nor does it depend on antenna gain.

The multi-path sensitivity threshold $S_M$ depends on the transmission mode, on the desired quality (target BER), on the contribution of thermal noise, and on the signal-to-noise ratio deduced from simulations at link level in a multi-path context associated with a propagation scenario, and it may be expressed as follows:

$$S_M = SNR + Pb \quad (2)$$

$$S_M = SNR + kTB_w + L_0 = SNR + 10 \cdot \text{Log}(kT) + 10 \cdot \text{Log}(Bw) + L_0$$

$$S_M = SNR + 10 \cdot \text{Log}(kT0) + 10\text{Log}\left(\frac{T}{To}\right) + 10 \cdot \text{Log}(Bw) + L_0$$

$$S_M = SNR - 114 \text{ dBm} + NF + 10 \cdot \text{Log}_{10}(Bw_{MHz}) + L_0(\text{dBm})$$

$$SNR_{TEBc=10^{-5}} = \left(\frac{Ebu}{No}\right)_{TEBc=10^{-5}} \cdot \frac{D}{B_w}$$

With reference to the above equation, the multi-path sensitivity threshold $S_M$ may be expressed as a function of the data rate D:

$$SNR_{BER=10^{-5}} = \left(\frac{Ebu}{No}\right)_{BER=10^{-5}} \cdot \frac{D}{B_w}$$

$$S_M = SNR + kTB_w + L_0 = \frac{Ebu}{No} + 10 \cdot \text{Log}(kT) + 10 \cdot \text{Log}(D_{Mbps}) + L_0$$

$$S_M = \frac{Ebu}{No} + 10 \cdot \text{Log}(kT0) + 10\text{Log}\left(\frac{T}{To}\right) + 10 \cdot \text{Log}(D_{Mbps}) + L_0$$

$$S_M = \frac{Ebu}{No} - 114 \text{ dBm} + NF + 10 \cdot \text{Log}_{10}(D_{Mbps}) + L_0(\text{dBm})$$

The sensitivity threshold S of a transmission mode corresponds to the minimum power required to ensure a data rate D, as calculated on the data field, with a target BER (BERt) representative of the QoS on a Gaussian channel (a perfect channel with additive white Gaussian noise (AWGN), i.e. without multiple paths (typically a Dirac function)). The expression for S is identical to the expression for $S_M$ by using the following notation:

$$\left(\frac{Ebu}{N0}\right)_c^{AWGN} \text{ and } SNR_c^{AWGN}.$$

The multiple path channel margin MCM is a dimensionless number that may be deduced from several variables, SNR, Ebu/No, or the minimum required power, using the following expressions:

$$MCM = \left(\frac{Ebu}{N0}\right)_c - \left(\frac{Ebu}{N0}\right)_c^{AWGN} \quad (4)$$

$$MCM = SNR_c - SNR_c^{AWGN}$$

$$MCM = S_M - S$$

where (Ebu/No)c is the mean energy per payload bit divided by the noise spectral density that is required for a target binary error rate BERt, SNRc is the corresponding signal-to-noise ratio, and $S_M$ is the minimum power required on reception for the same BERt.

The MCM parameter corresponds to the additional power (or to the variation in the signal-to-noise ratio ΔSNR in dB, or to the variation in the energy per payload bit divided by the noise spectral density ΔEbu/No in dB) in a multi-path context, that is needed in order to achieve a BER that is identical to the Gaussian situation, for a given transmission mode.

Figure 12B:
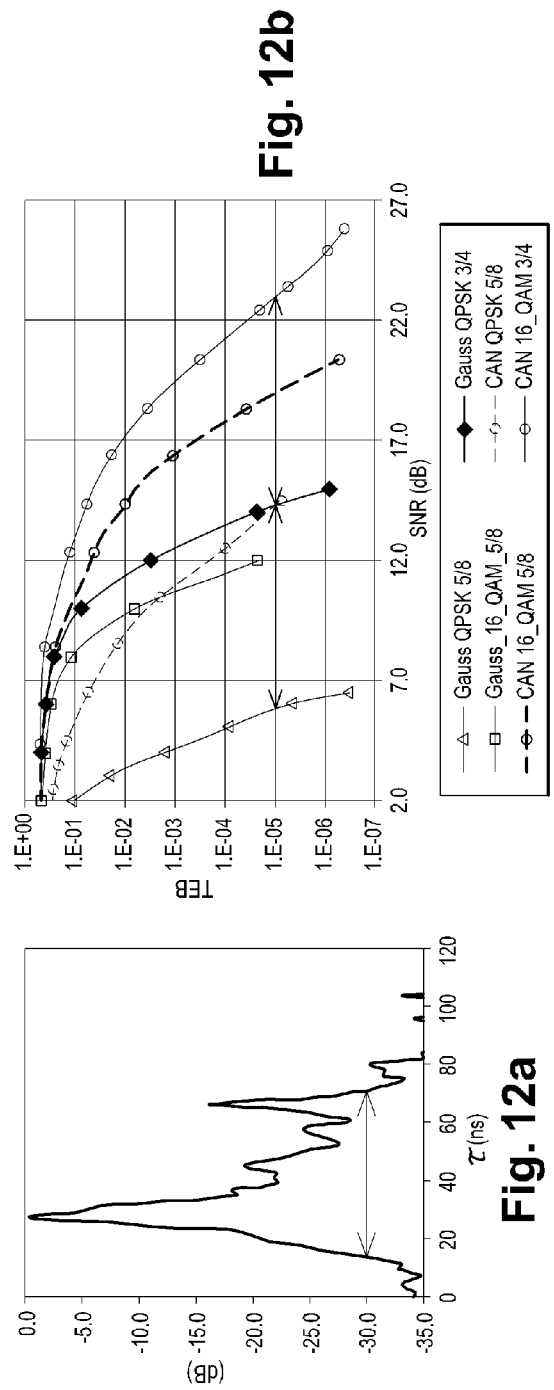
FIG. 12b shows the BER as a function of the signal-to-noise ratio (SNR) for various transmission modes (different MCSs for the same transmission techniques) in a multi-path environment and for a perfect channel. This figure shows the multi-path channel margin for two MCS transmission modes.
Figure 12A:
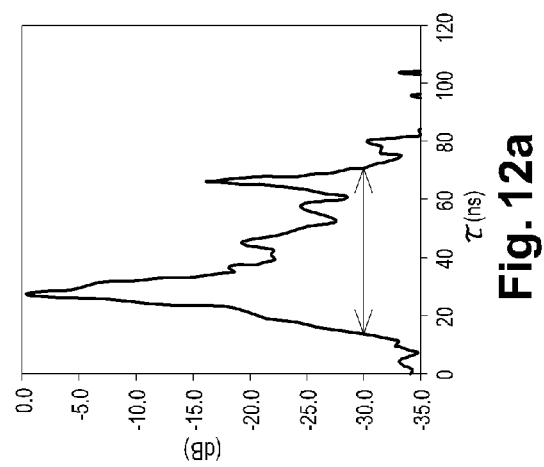
FIG. 12a shows the impulse response of the channel associated with FIG. 12b.

FIG. 12b plots BER as a function of SNR for different transmission modes and for a Gaussian channel and for a multi-path channel. For a given BER and for a given mode, the multiple path channel margin MCM is the distance between the two curves that correspond respectively to the Gaussian channel and to the multiple path channel as shown in the form of double-headed arrows in FIG. 12b.

The effect of attenuation of the propagation channel in a multiple path context and over a link that is partially obstructed gives rise to additional attenuation and reduces the radio coverage (range) of a transmission interface, taking into consideration in succession ideal point-to-point transmission without obstruction and transmission in an environment having obstacles that obstruct the link and increase the attenuation due to the propagation channel. The attenuation due to the propagation channel as modeled by an equation of the type PL(d) is a physical variable representative of the physical environment and it is deduced from experimental measurements. The relative attenuation effect of the propagation channel depends only on the environment and on the deployment scenario (range, antenna, etc.), and does not depend on the telecommunications entity, with the exception of the impact of the carrier frequency on transmission when calculating attenuation. A signal transmitted at a power Pt is received at a distance d with a power Pr, with Pr<Pt. The ratio of Pt to Pr represents the propagation attenuation for antenna gains equal to zero (the effect of the antennas (antenna gains GT and Gr) is not taken into consideration in order to provide the attenuation model for a given environment).

The simplest attenuation model is the free space model deduced from Friis' transmission equation known to the person skilled in the art. This model corresponds to the attenuation when no obstacle obstructs the link. The relationships between distance and attenuation varies with $(d/d0)^2$ where d is the distance between the two measurement points and d0 is a reference distance that is generally set at 1 m. The formulation for the Friis' transmission equation is as follows:

$$PL_{FS}(d,fc)_{dB} = -27.55 + 20 \log(fc_{MHz}) + 20 \log(d_m/d0=1 \text{ m}) \quad (4)$$

with $d_m$ being distance expressed in meters and $fc_{MHz}$ being the carrier frequency expressed in MHz.

When the link is obstructed or slightly obstructed, the transmission equation is modified and attenuation as a function of distance is proportional to $(d/d0)^n$ with n>2. The modified formulation has the following form:

$$PL_{MFS}(d, fc) = PL_{FS}(d_0, f_c) + 10 \cdot n\log_{10}\left(\frac{d}{d_0}\right) + \sigma \quad (6)$$

$$PL_{FS}(d_0, fc) = PL_{FS}(d_0, f_{c0}) + 20 * \text{Log}\left(\frac{fc}{f_{c0}}\right) \quad (7)$$

with $f_{c0}$ being the reference frequency, and $\sigma$ being the standard deviation associated with the propagation model.

Figure 13:
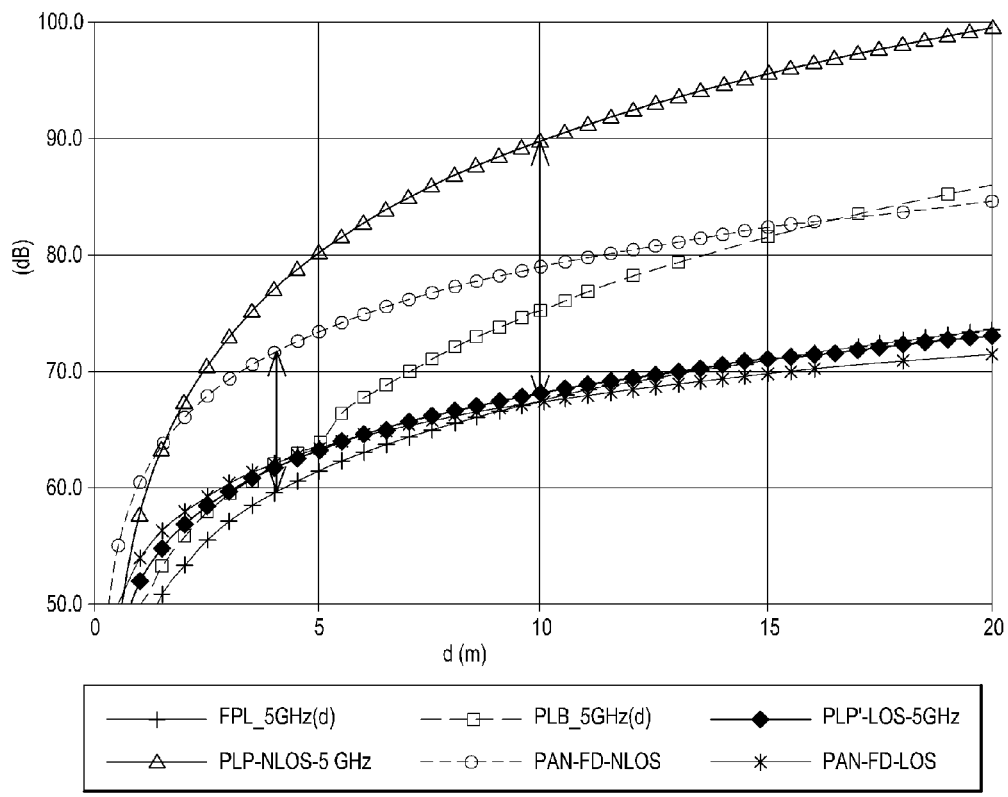
FIG. 13 shows different attenuation models for the propagation channel as a function of the distance d for an RF frequency fc equal to 5.2 GHz and for different WPAN scenarios (i.e. d<5 m): the free space model ($F_{PL\_5GHz}$(d)), the PLB_5 GHz(d) model associated with IEEE802.11n standard and with a channel that has very little frequency selectivity (channel B), the UWB models specified by P. Pagani and derived from the article by P. Pagani and P. Pajusco "Statistical modeling of the ultra-wideband propagation channel through the analysis of experimental measurements", Comptes Rendus Physique de l'Academie de Sciences [Physics Proceedings of the Academy of Sciences], Vol. 7, No. 7, pp. 762-773, September 2006 in LOS and in NLOS at 5 GHz (PLP-LOS_5 GHz/PLP-NLOS_5 GHz), and the models derived from the IST MAGNET project and referred to as PAN-FD (PAN, fixed device), with no obstruction (LOS) and in obstructed space (NLOS).

FIG. 13 gives the attenuation as a function of distance d for various carrier frequencies fc in free space (no obstruction=LOS) and in obstructed space (NLOS). The curves labeled PAN-FD-NLOS/LOS correspond to a scenario of the MAGNET project corresponding to a fixed access point and to a terminal with little mobility. The curves marked PLP-LOS/NLOS-5 GHz correspond to the UWB attenuation models at 5.2 GHz as mentioned above. The curve FPL__5 GHz(d) corresponds to the free space model at 5.2 GHz. The curve PLB__5 GHz(d) corresponds to the attenuation model defined by the IEEE802.11n standard when considering the RF channel at 5.2 GHz. This model is described by V. Erceg, L. Shumacher, P. Kyritsi, A. Molish, D. S. Baum, et al. in the document "TGn channel models", IEEE P802.11, IEEE 802.11-03/940r1, November 2003.

In visibility (LOS), the attenuation models are all equivalent regardless of the modeling procedure (measurements). With non-visibility, the models present variations associated with measurement conditions, with the sampling bandwidth of the channel, and with the assumptions on which the model is based. The UWB-NLOS attenuation model referenced PLP-NLOS presents greater attenuation than the attenuation model constructed in the context of the MAGNET project (PAN-FD-NLOS). The PLB attenuation model derived from IEEE802.11n standardization is a hybrid visibility/non-visibility model. Beyond 5 m, the attenuation model is assumed to be a non-visibility model, and at shorter distances it is assumed to be a visibility model.

The narrow band channel margin (NBCM) parameter corresponds to the additional attenuation between the two obstructed and free space configurations; it serves to quantify the effect of the transmission medium on selecting a transmission interface. For the same distance and the same mode, the narrow band channel margin (NBCM) is the distance between the two curves that correspond respectively to free space and to obstructed space, as represented by the double-headed arrow in FIG. 13.

This NBCM difference no longer depends explicitly on the RF frequency and consequently makes it possible to take account only of the relative medium degradation, independently of the explicit attenuation of the frequency and of the transmission powers (NBCM is calculated for a given distance d between the transmitter and the receiver). The NBCM parameter is expressed as follows:

$$NBCM = \quad (8)$$

$$PL_{MFS}(d) - PL_{FS}(d) = 10 \cdot n\log_{10}\left(\frac{d}{d_0}\right) - 10 \cdot \log_{10}\left(\frac{d}{d_0}\right)^2 + \sigma$$

$$NBCM = 10\text{Log}\left(\left(\frac{d}{d_0}\right)^{n-2}\right) + \sigma$$

Attenuation models for each environment are known to the person skilled in the art. Table A.2 in Appendix A gives parameter values to be taken into consideration for the various propagation models under consideration for the MAGNET, IEEE 11n, and UWB systems that are taken into account, in association with equations (6) and (7).

The method of selecting a transmission mode is implemented by a communications entity (access point, base station, terminal, etc.) that has a plurality of transmission modes enabling the same data rate D to be achieved for one or more propagation scenarios. Each transmission mode is associated with a transmission interface. The entity comprises one or more different interfaces. When establishing communication with another communications entity (access point, base station, terminal, etc.), the common transmission mode must be selected by the entities. This selection is performed by the transmitter entity by implementing a selection method of an embodiment of the invention.

Figure 14:
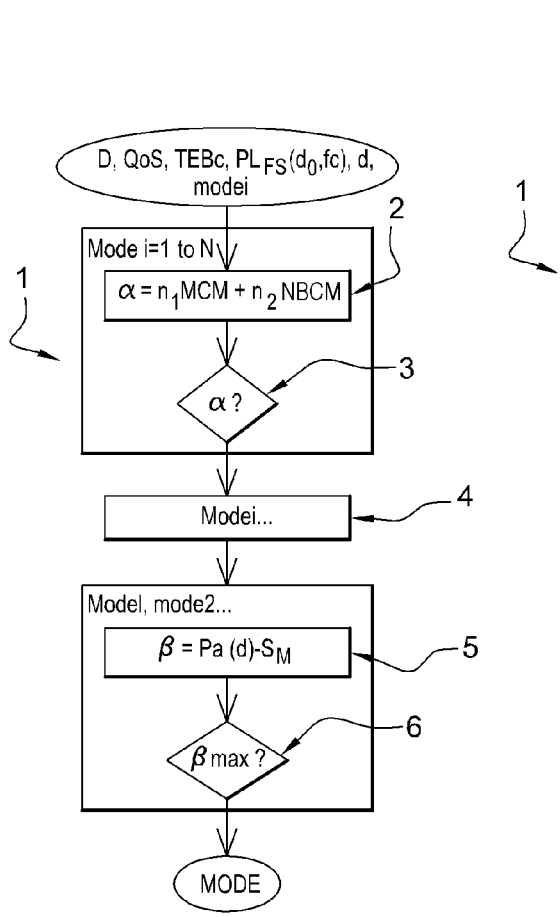
FIG. 14 is a flow chart of a particular implementation of a selection method of an embodiment of the invention.

With reference to FIG. 14, for a given transmission mode, the selection method 1 determines 2 the value of the metric $\alpha$ for a distance d:

$$\alpha = \eta_1 MCM + \eta_2 NBCM \quad (9)$$

The default value for the weighting coefficients $\eta_1$ and $\eta_2$ is one. The NBCM parameter is calculated for a given environment with which an attenuation model is associated. The MCM parameter is determined for a target QoS, typically a target binary error rate BERt=$10^{-5}$. The metric $\alpha$ does indeed give a measurement of the relative degradation introduced by the transmission medium on the communications signal for a given environment compared with a reference model for the transmission medium, since MCM corresponds to the additional power needed for a multiple path channel compared with a Gaussian reference channel in order to obtain the same BER, and NBCM corresponds to the additional attenuation obtained for an attenuation model in obstructed space compared with that obtained for a reference attenuation model in free space.

Thus, the selection method has as many values for the metric $\alpha$ as it has different transmission modes under consideration, $\text{Mode}_1, \ldots, \text{Mode}_N$, for a distance d, a data rate D, and for the propagation scenarios under consideration.

In a step 3, the selection method sorts the values of $\alpha$ into increasing or decreasing order, and in a step 4 it selects at least one transmission mode. The method selects the modes $\text{Mode}_i$ for which the value of the metric $\alpha$ is the smallest with a variation range of 10%.

In a first particular implementation, for the selected transmission mode or for the various selected transmission modes $\text{Mode}_i$, the selection method acts in a step 5 to determine the value of a second metric $\beta$ for a selected transition mode, where the metric $\beta$ measures the excess non-normalized power available at the distance d, i.e. the difference between the available power and the minimum required power:

$$\beta = Pa(d) - S_M$$

The value of this second metric $\beta$ varies in particular with the contribution of noise in a given transmission band, which contribution, on increasing, requires increasing transmission power.

The minimum power $S_M$ required for ensuring a transmission data rate D for a given transmission mode when the propagation channel has multiple paths, corresponds to the multiple path sensitivity threshold.

The available power Pa(d) depends on the environment under consideration and on the equivalent isotropically radiated power EIRP at the outlet from the transmit antenna. Pa(d) is given by:

$$Pa(d) = EIRP - PL_{MFS}(d) + Gr(\text{dBm}) \quad (10)$$

with Gr being the gain of the receive antenna, and EIRP being the equivalent isotropically radiated power from the transmit antenna of the transmitting entity given by the expression:

$$EIRP=Pt+Gt(\text{dBm}) \qquad (11)$$

with Pt being the input power to the transmit antenna, and Gt being the gain of the transmit antenna.

The second metric $\beta$ can thus be expressed by the following equation:

$$\beta=EIRP+Gr-PL_{FS}(d)-\alpha-S \qquad (12)$$

The available power Pa(d) must be not less than the minimum power $S_M$ required for establishing communication in a transmission mode selected on the basis of the first metric $\alpha$:

$$Pa(d) > S_M$$

i.e.: $\beta > 0$.

The first metric $\alpha$ makes it possible to achieve a certain target quality of service QoS, typically a target binary error rate $BERt=10^{-5}$, for delivering a data rate D over the distance d, while the second metric $\beta$ makes it possible to check that the power available at the distance d for the selected mode is indeed sufficient.

The transmission modes selected on the basis of the first metric $\alpha$ for which the second metric $\beta$ is less than zero are not taken into consideration since they do not provide sufficient power at the distance d.

If a plurality of transmission modes are selected on the basis of the first metric $\alpha$ then the selection method acts in a step 6 to select one mode from those various modes on the basis of the second metric $\beta$: the selected mode MODE is the mode for which $\beta$ is the greatest between two values $\beta$min and $\beta$max. $\beta$min is equal to zero, possibly plus a margin of 2/3 dB, and $\beta$max is about 35 dB. Taking $\beta$max into account is optional and serves to limit the transmission power and to improve coexistence between communications entities present within the same coverage zone.

Figure 15:
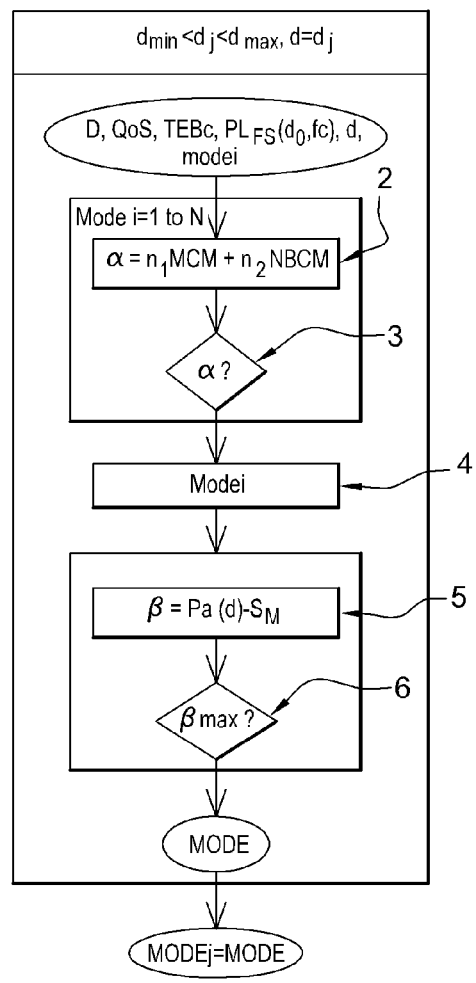
FIG. 15 is a flow chart of a particular implementation of a selection method of an embodiment of the invention.

In a particular embodiment shown in FIG. 15, the selection method may calculate values for the metric $\alpha$ for a plurality of values of d, typically for a range:

$$d_{min} < d \leq d_{max}$$

The maximum value $d_{max}$ is a parameter that may have a default value associated with the deployment scenario under consideration, e.g. a few tens of meters for the WPAN scenario. The value $d_{max}$ may be modified as a function of the communications entity implementing the selection method, and more particularly of the technologies of its transmission interfaces or of its geographical location while being installed on site.

In this implementation, the selection method repeats the steps 2, 3, 4, 5, and 6 for values of d varying over the range $d_{min}$ to $d_{max}$. At the end of this repetition, the method has selected a single mode $MODE_j$ for each distance value $d_j$.

In this implementation, the method may estimate the range of variation in $\alpha$, $$\alpha_{j,min} \leq \alpha_j \leq \alpha_{j,max}$$

for the various modes $MODE_j$ selected over the range $$d_{min} < d \leq d_{max}$$

as follows.

A selected mode $MODE_j$ may be selected for a plurality of successive values of d. Over this range of distances d, the values of the metric $\alpha$ for the selected mode $MODE_j$ may vary between two values: $\alpha_{j,min}$ and $\alpha_{j,max}$. The values $\alpha_{j,min}$ and $\alpha_{j,max}$ relate to the points of intersection between the various selected modes $MODE_j$. For any one selected mode $MODE_j$, the value $\alpha_{j,max}$ corresponds to the point of intersection (local maximum) associated with the nearest mode in accordance with the way the transmitter-to-receiver distance varies, or indeed with the value at the origin in the absence of any point of intersection, $\alpha_{j,max}$ is associated with a distance $d_1$. The value $\alpha_{j,min}$ corresponds to the point of intersection (local minimum) associated with the nearest mode in accordance with the variation of the transmitter-to-receiver distance, or else to the value at the origin if there is no point of intersection, $\alpha_{j,min}$ is associated with a distance $d_2$.

Figure 16:
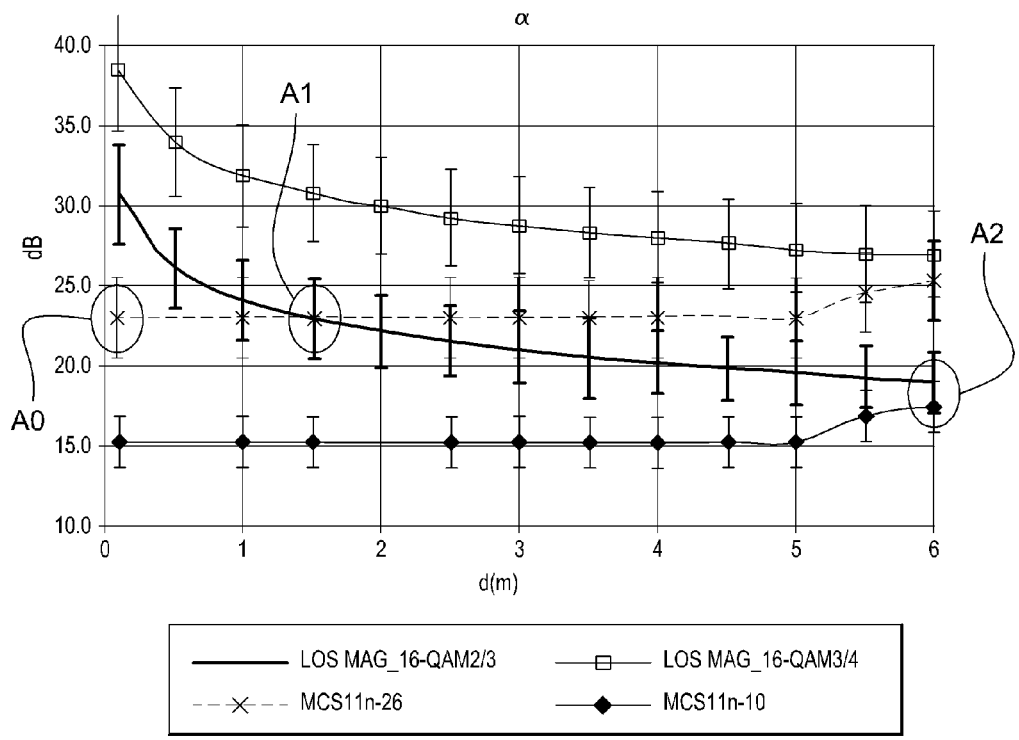
FIG. 16 shows the values of the first metric α as a function of the distance d for the 16QAM 2/3 and 16QAM 3/4 transmission modes for the assumed-LOS scenario of a MAGNET MC-SS system and for the $MCS_{11n}10$ and $MCS_{11n}26$ transmission modes of an IEEE802.11n system, which values are extracted from FIGS. 19 and 21.

FIG. 16 serves to illustrate this implementation for a visibility scenario. For a distance d less than 1.5 m, the selected mode $MODE_i$ is the $MCS_{11n}$-26 mode and the values of $\alpha_{min}$ and $\alpha_{max}$ are associated with the points A0(0, 22.9) and A1 (1.5, 22.9) with $\{\alpha_{min}=\alpha_{max}\}=\{22.9\}$. Beyond that distance, for a distance lying in the range 1.5 m to 6 m, the selected mode, $MODE_j$, is the LOS-MAG-16-QAM 2/3 mode and the corresponding values of $\alpha_{min}$ and $\alpha_{max}$ are associated with the points A2(6, 17.4) and A1 with $\{\alpha_{min},\alpha_{max}\}=\{17.4, 22.9\}$. The MCS-11n-10 mode is assumed to be available for a distance greater than 6 m.

Figure 17:
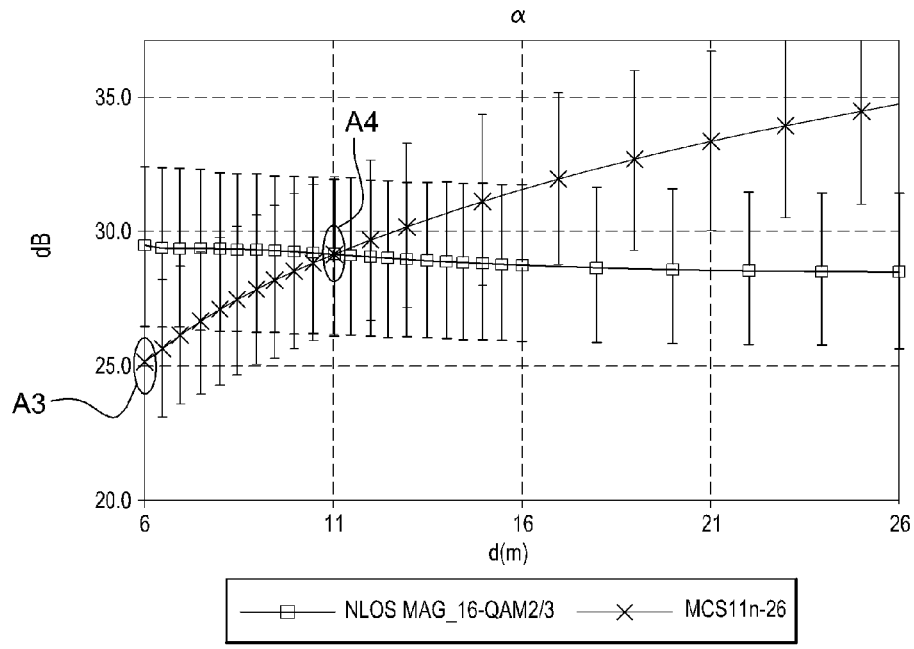
FIG. 17 shows the values of the first metric α as a function of the distance d for the 16QAM 2/3 transmission mode for the assumed-NLOS scenario of a MAGNET MC-SS system and for the $MCS_{11n}26$ transmission mode of an IEEE802.11n system, which values are extracted from FIGS. 19 and 21.

FIG. 17 relates to longer distances that give rise to a change in propagation scenarios and to the transmission modes that are selected. For a distance d<12 m, the selected mode, $MODE_j$, is the MCS-11n 26 mode.

The values for $\alpha_{min}$ and $\alpha_{max}$ are associated with the points A3(6, 25) and A4(11, 29.1) with $\{\alpha_{min},\alpha_{max}\}=\{25.0, 29.1\}$. Beyond this distance, the selected mode, $MODE_j$, is the MAG-NLOS-16-QAM 2/3 mode.

Figure 2:
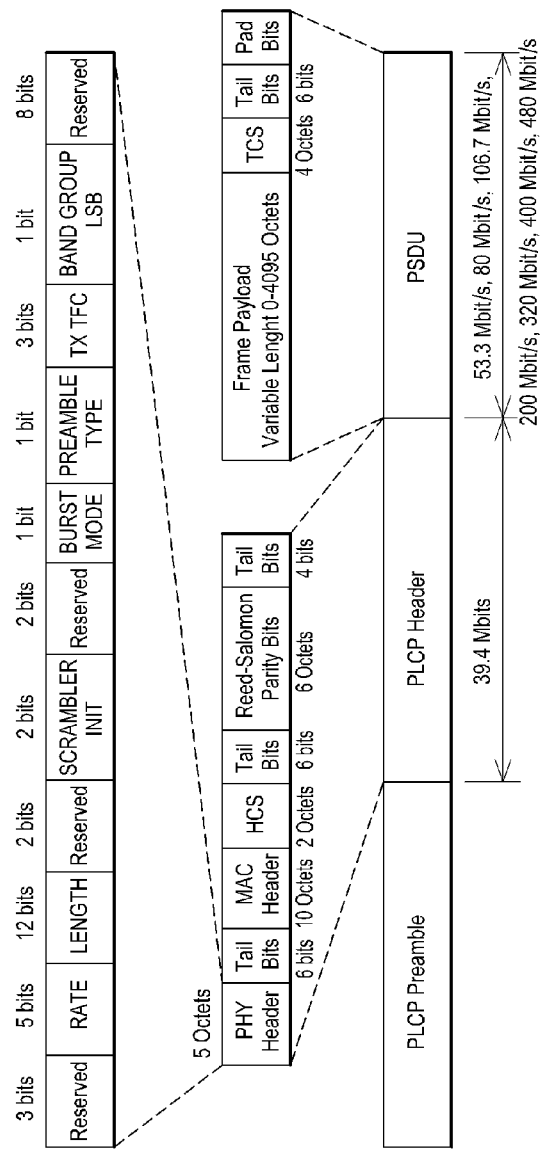
FIG. 2 shows an example of a physical frame (the structure of a PPDU) corresponding to a frame of the single frame MAC mode of the ECMA-368 standard.
Figures 3, 4:
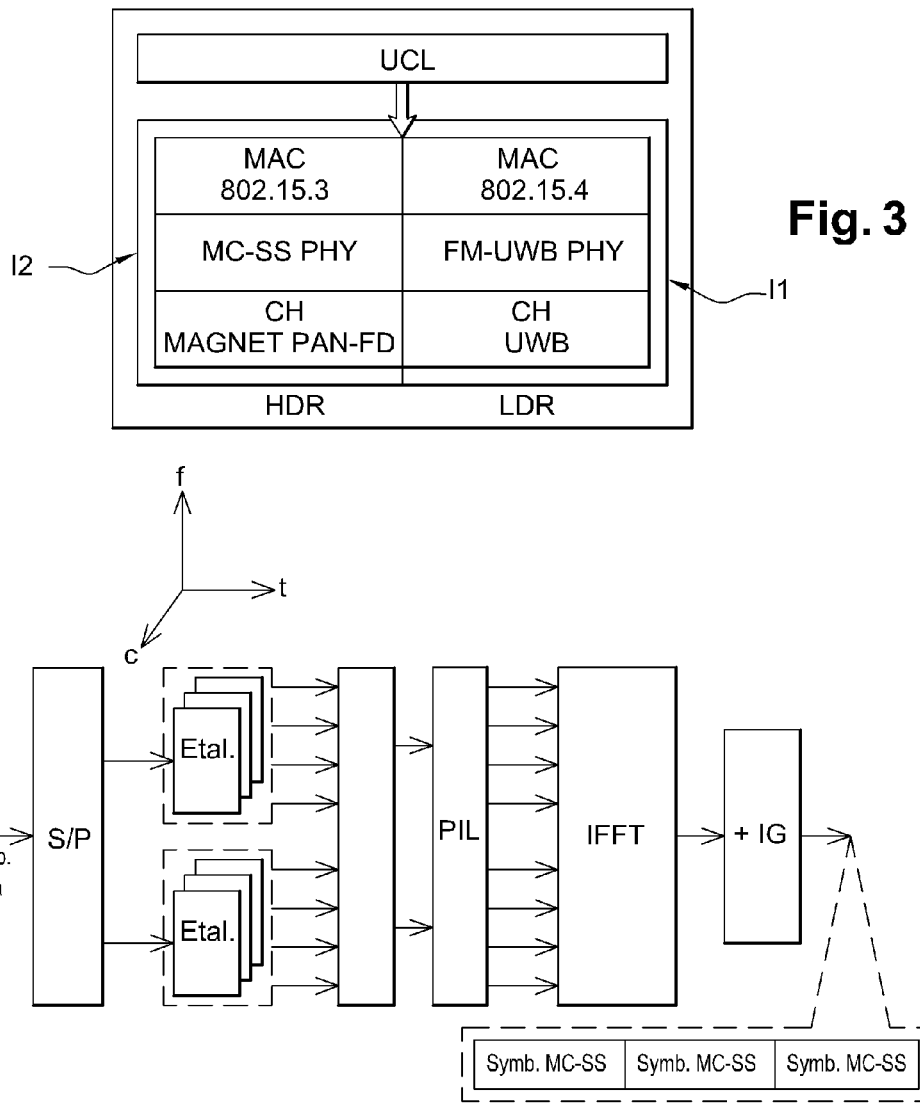
FIG. 3 is a diagram showing the composition of an IST-FP6 MAGNET system having two transmission interfaces (MC-SS and UWB-FM) delivering different data rates, this diagram showing the UCL layer that manages selecting transmission modes associated with the interfaces. The system operates on the RF channels of the IEEE802.11n system (2.4 GHz and 5.2 GHz) for the MC-SS transmission interface, and in the {3.1-10.6} GHz UWB band for the UWB-FM transmission interface.
FIG. 4 is a diagram illustrating the PHY layer of the MAGNET system implementing an MC-SS transmission technique associated with various modulation and coding schemes generating different transmission modes.
Figure 5:
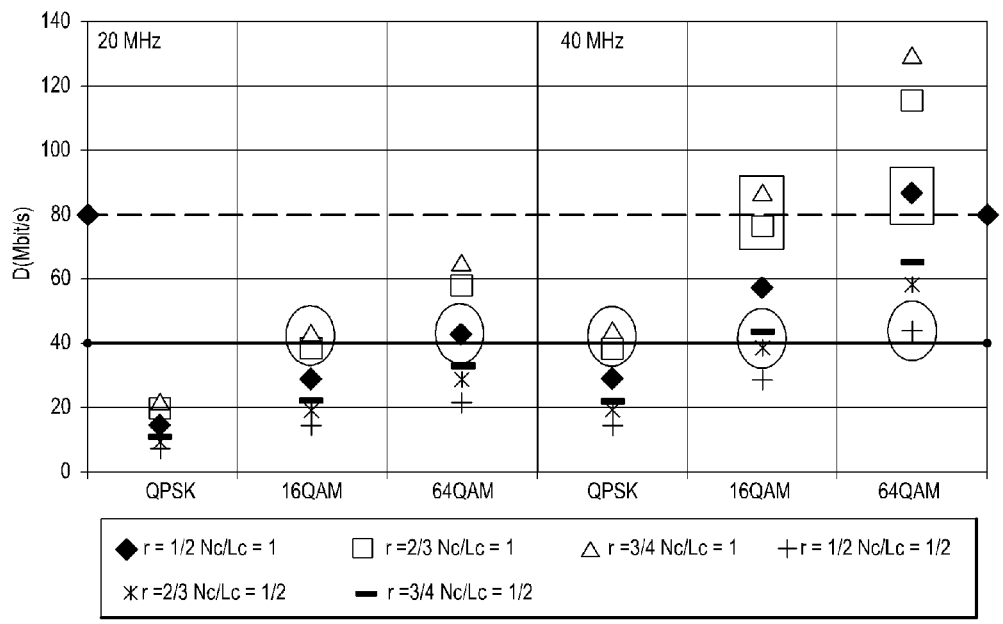
FIG. 5 shows various data rates that can be obtained for various transmission modes associated with the MC-SS type transmission interface of the MAGNET system.
Figure 7:
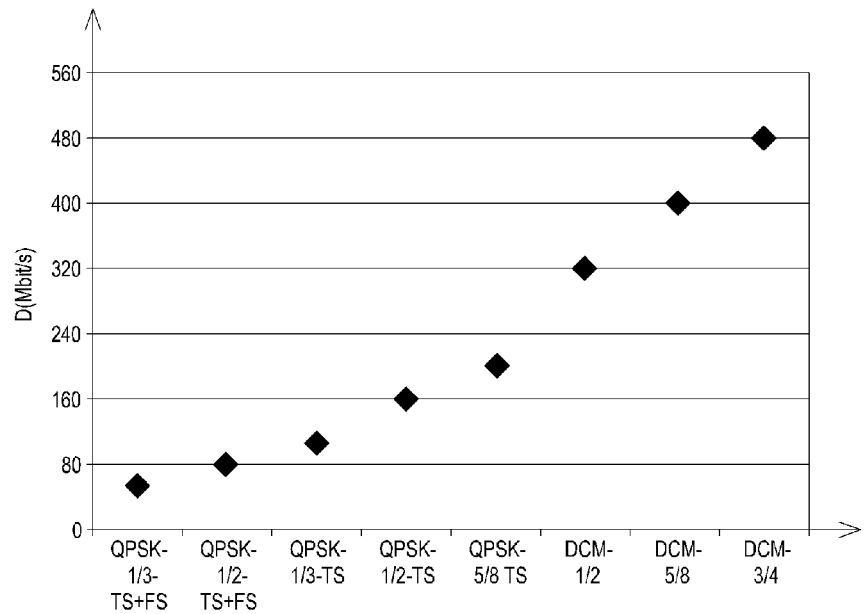
FIG. 7 shows the data rate obtained for the various transmission modes of the ECMA-368 system.
Figure 6:
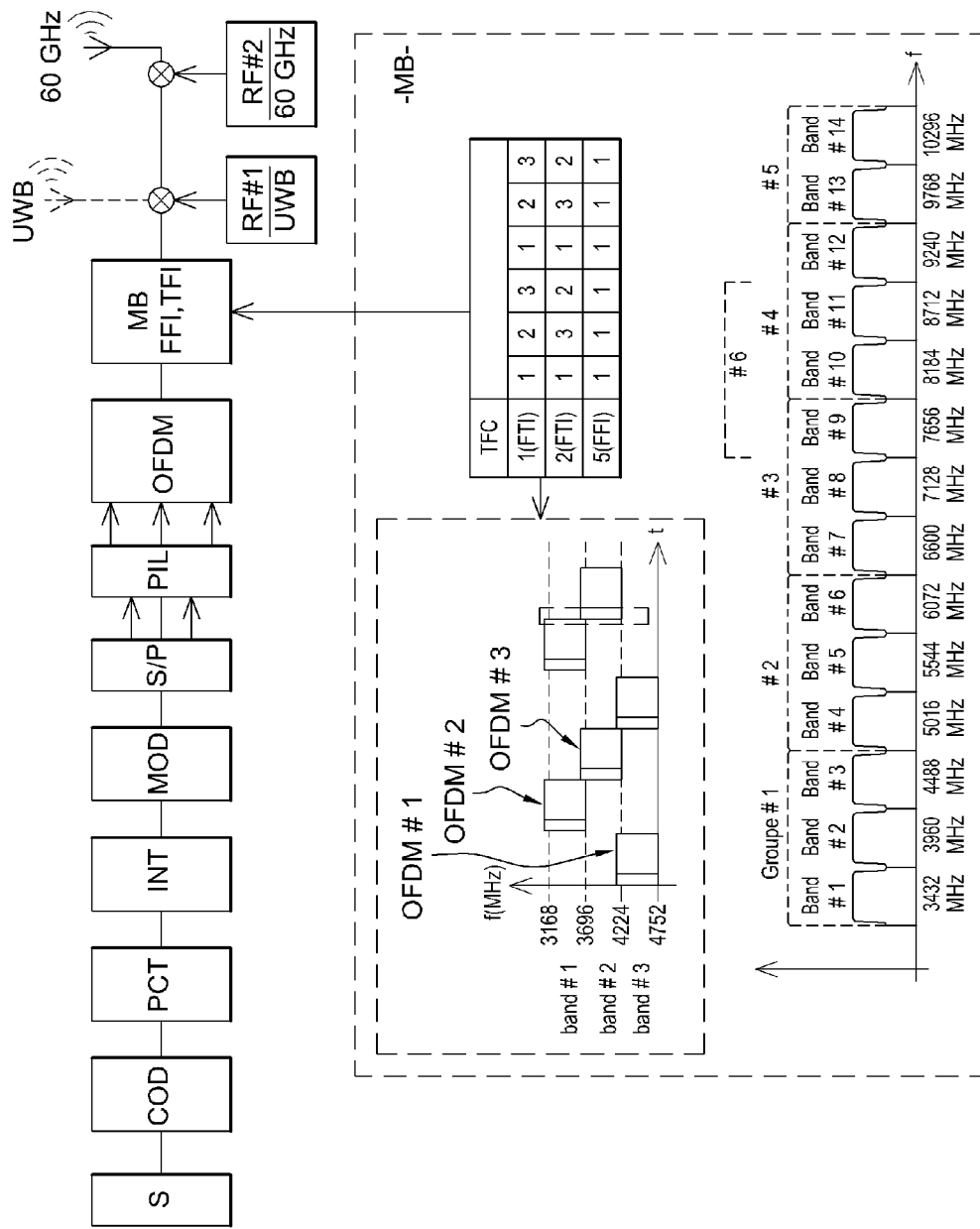
FIG. 6 is a diagram of the PHY layer of the Wi-Media/ECMA-368 system that relies on OFDM modulation performed on 528 MHz channels associated with a frequency hopping method applied to successive OFDM symbols associated with adjacent channels of a band group.
Figure 8:
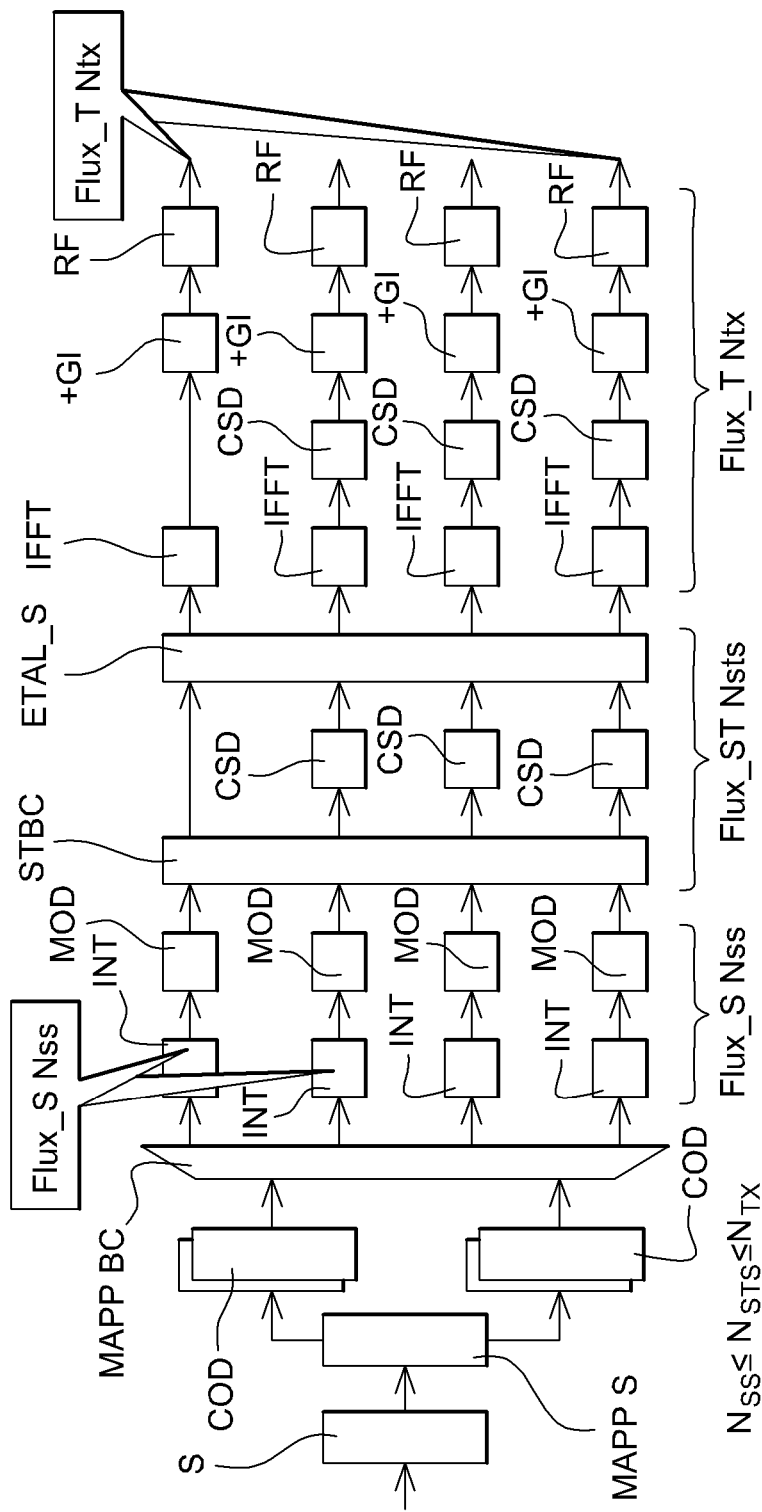
FIG. 8 is a diagram describing the PHY layer of the IEEE802.11n system. Its transmission modes make use of the MIMO transmission technique. Increasing the number of spatial streams (1≤Nss≤4) and increasing the transmission bandwidth (20 MHz or 40 MHz) serves to increase the transmission data rate by putting streams of bits for transmission in such a system in parallel.
Figure 9:
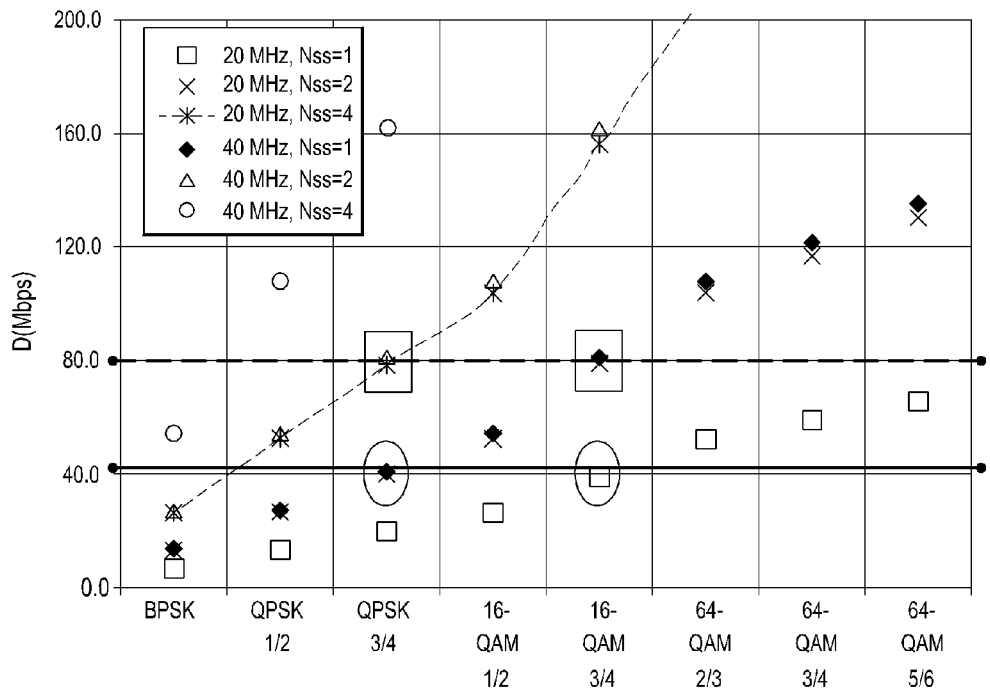
FIG. 9 shows the data rates obtained for the various transmission modes of the IEEE802.11n system and referred to as $MCS_{11n}$ in the present document. The data rates are given as a function of modulation and coding schemes MCS, of the number of space streams Nss, and of the size of the channels (20 MHz or 40 MHz), with this being for a cyclic prefix size equal to 800 ns.
Figure 10:
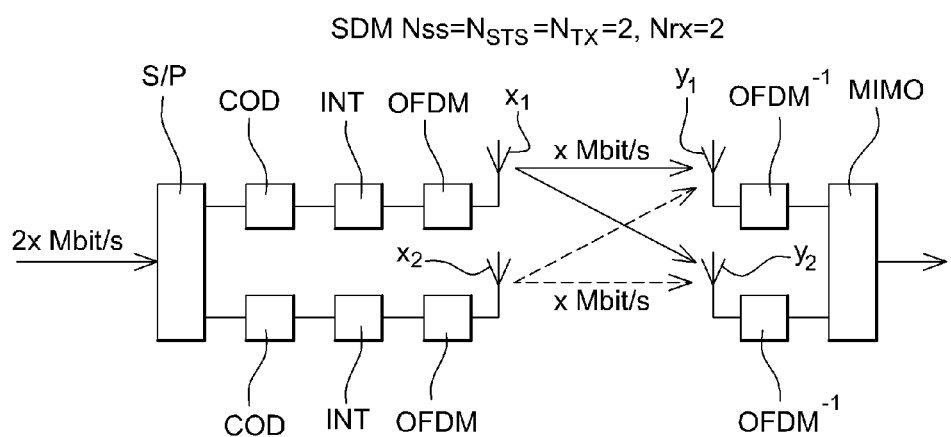
FIG. 10 is a diagram of a configuration of an IEEE802.11n system including a MIMO technique of the SDM (Spatial Division Multiplexing) type for which the space streams are not subjected to any space-time coding ($Nss=N_{STS}=N_{TX}$).
Figure 11:
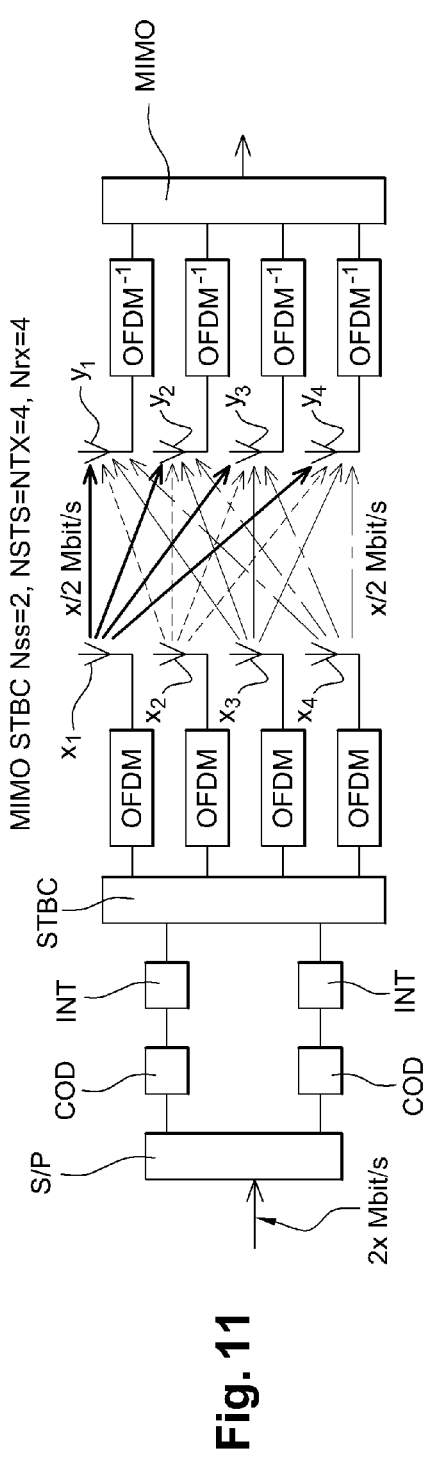
FIG. 11 is a diagram of a configuration of an IEEE802.11n system comprising a MIMO technique of the STBC type with two space streams, four space-time streams, four transmit antennas, and four receive antennas.
Figure 18:
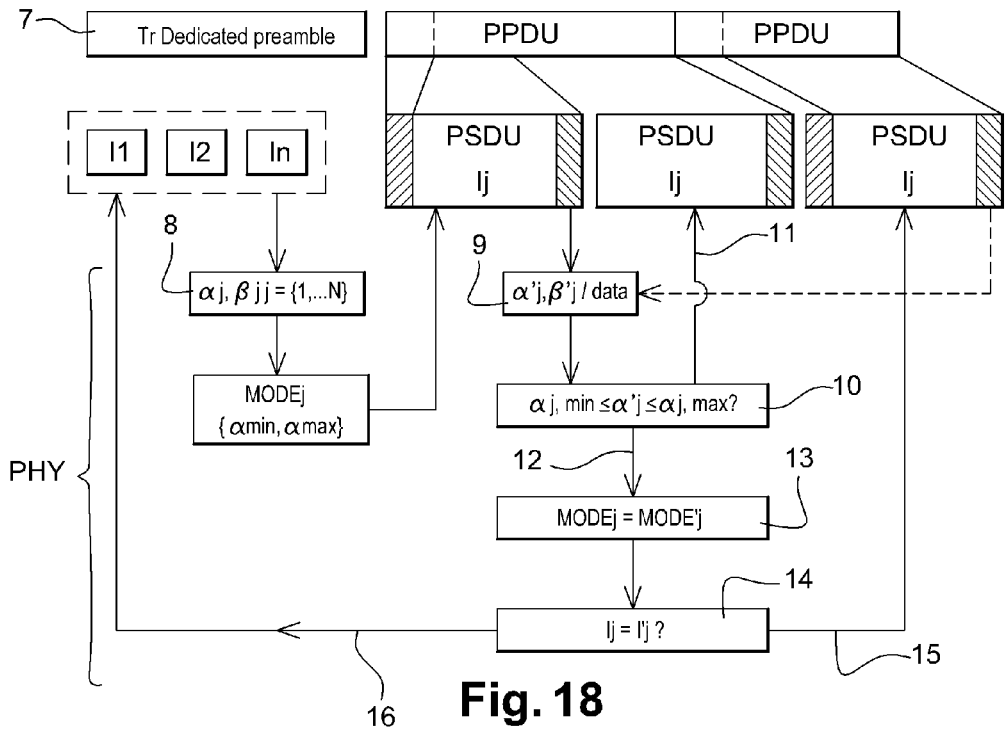
FIG. 18 is a flow chart showing a particular implementation of a selection method of an embodiment of the invention.

The implementation of a selection method of an embodiment of the invention is illustrated by FIG. 18. In this implementation, the method further comprises a step 7 of transmitting a dedicated preamble frame. This dedicated preamble frame TR comprises sequences dedicated to estimating the metrics $\alpha$ and $\beta$ for at least two different transmission modes, the dedicated sequences containing data that is known on reception. The preamble frame TR makes it possible in a step 8 to estimate the metrics $\alpha$ and $\beta$ using the method 1 shown in FIG. 15. This dedicated frame is incorporated in an inter-MAC layer that is equivalent to the UCL layer of a MAGNET system as shown in FIG. 2, and that encapsulates various PPDU frames associated with the various transmission interfaces $I_j$, themselves associated with the various transmission modes under consideration. This makes it possible to avoid changing the PHY frame formats associated with existing systems.

The entity receiving the dedicated frame estimates the metrics $\alpha$ and $\beta$ from the dedicated sequences for the various transmission modes, $MODE_j$, under consideration, thereby making it possible to obtain $\alpha_j$ and $\beta_j$. The receiver entity transmits to the transmitter entity the various estimates for the metrics $\alpha$ and $\beta$ using methods known to the person skilled in the art (in particular this transmission may follow a so-called "return" channel).

In one implementation, the selection method is dynamic.

In this implementation, the selection method acts in a step 9 to update the metrics $\alpha$ and $\beta$ using data transmitted by the communications signal, thereby obtaining $\alpha'_j$ and $\beta'_j$.

If in step 10 the updated metric $\alpha'_j$ lies within the variation range $$\alpha_{j,min} \leq \alpha_j < \alpha_{j,max}$$

of the selected mode $MODE_j$, then in step 11, in compliance with the structure of the PPDU frame of the interface j corresponding to the mode $MODE_j$, a new PSDU frame is injected (or else a PPDU frame as a function of the MAC protocols).

If in step 10 the updated metric $\alpha'_j$ does not lie within the variation range of the mode j, then in step 12, a new mode is selected in step 13 in application of the selection method 1 using the metric values deduced from the preceding dedicated frame and using the value for the MCM parameter as previously calculated and stored, and also using an NBCM parameter as updated using the data.

If, in step 14, the new selected mode $MODE_j$ corresponds to the same interface $I_j$, then in step 15, a PSDU frame or a PPDU frame is injected in compliance with the frame of the interface $I_j$.

If in step 14 the transmission interface $I_j$ is modified, then in step 16, the dedicated frame is reinjected and the implementation method is reiterated.

This implementation serves advantageously to perform selection of the most appropriate transmission mode, practically in real time.

As soon as the value of the metric as updated on the base of the data moves out from a given range $$\alpha_{min} < \alpha < \alpha_{max}$$

and if the transmission interface is modified, then the selection method triggers the sending of a dedicated preamble frame at the beginning of a superframe.

The example below is an illustration of an implementation of a selection method of an embodiment of the invention for communications entities compatible with a MAGNET MC-SS system and having the capability of selecting two different transmission modes for a data rate D of about 80 Mbit/s. Table B.1 in Appendix B provides certain characteristics of a MAGNET MC-MSS system. FIG. 13 shows the 5 GHz attenuation models associated with this system. The two transmission modes are respectively 16-QAM 2/3 and 16-QAM 3/4. The NBCM parameter has the same values for these two modes since the attenuation models under consideration are the same.

Figure 19:
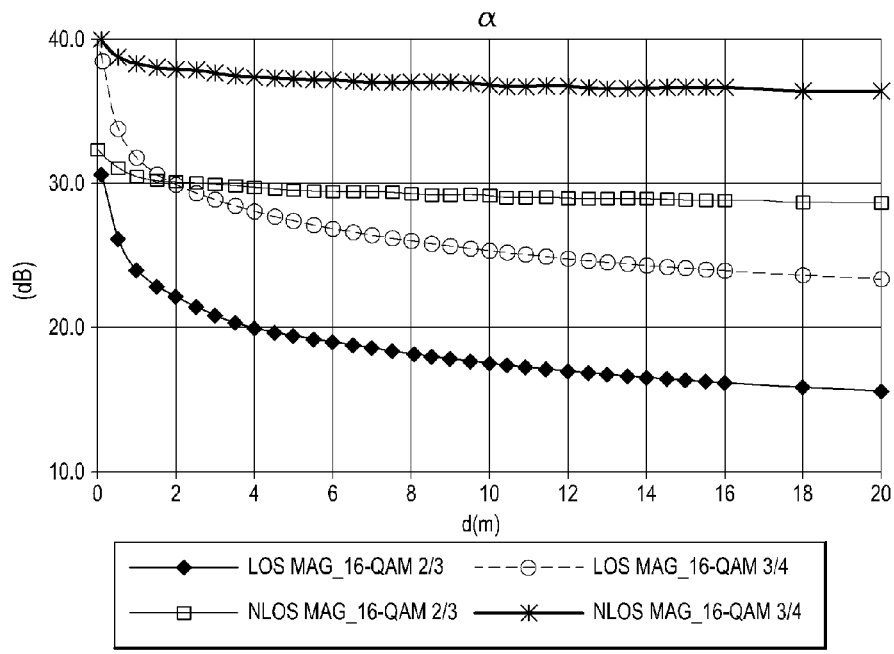
FIG. 19 shows the values of the first metric α for a target data rate of 80 Mbit/s as a function of the distance d for the MAGNET MC-SS system. Two WPAN scenarios associated with LOS and NLOS transmissions are considered, as are two transmission modes 16QAM 2/3 and 16QAM 3/4 of a MAGNET MC-SS system.

FIG. 19 gives the values of the first metric $\alpha$ for each of these two modes as a function of the distance d for the two scenarios under consideration, LOS and NLOS.

The method of an embodiment of the invention selects the transmission mode that leads to the smallest value for the first metric $\alpha$ for a given transmitter-to-receiver distance d. With a propagation scenario in visibility (LOS), or in non-visibility (NLOS), this is the 16-QAM 2/3 mode.

Figure 20:
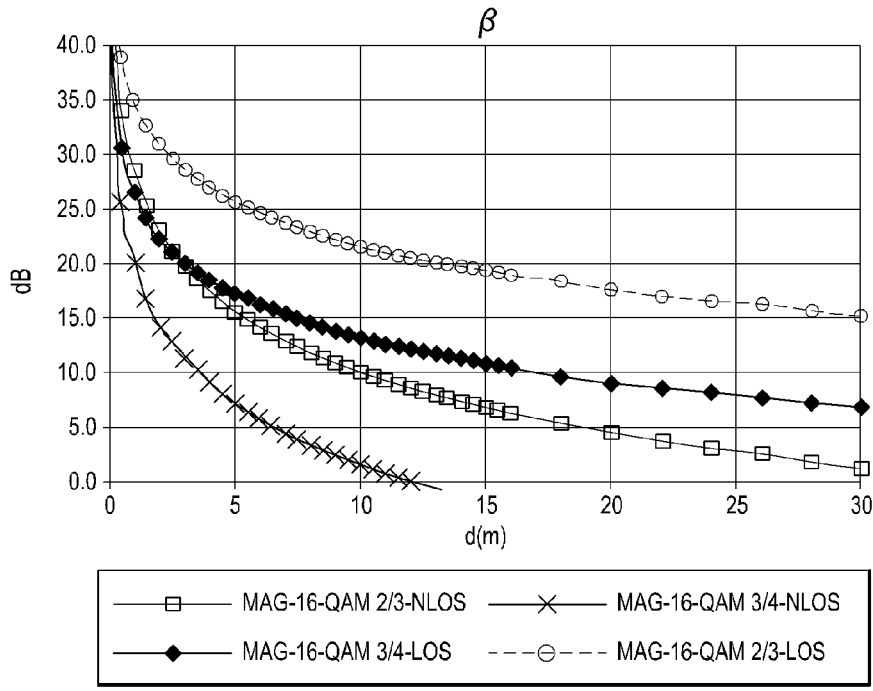
FIG. 20 shows the values of the second metric β for the 16-QAM 2/3 mode selected on the basis of the first metric α for the same MAGNET MC-SS system as shown in FIG. 19.

The method of an embodiment of the invention calculates the values of the second metric $\beta$ for the 16-QAM 2/3 mode selected on the basis of the first metric $\alpha$. These values are shown on the curve of FIG. 20. This curve reveals that the condition $\beta > 0$ is true for the entire range under consideration for distance d.

The example below is an illustration of an implementation of a selection method of an embodiment of the invention for communications entities that are compatible with an IEEE802.11n system having the possibility of selecting four different transmission modes for a data rate D of about 80 Mbit/s. Table B.2 in Appendix B provides certain characteristics of an IEEE802.11n system. FIG. 13 shows attenuation models at 5 GHz associated with this IEEE802.11n system.

The four transmission modes are respectively: $MCS_{11n}10$, $MCS_{11n}4$, $MCS_{11n}4$-STBC, and $MCS_{11n}26$, which correspond respectively to the following kinds of modulation: QPSK 3/4; 16-QAM 3/4; 16-QAM 3/4; and QPSK 3/4. The NBCM parameter has the same values for all four of these modes since the attenuation model PLB(d) under consideration is the same.

Figure 21:
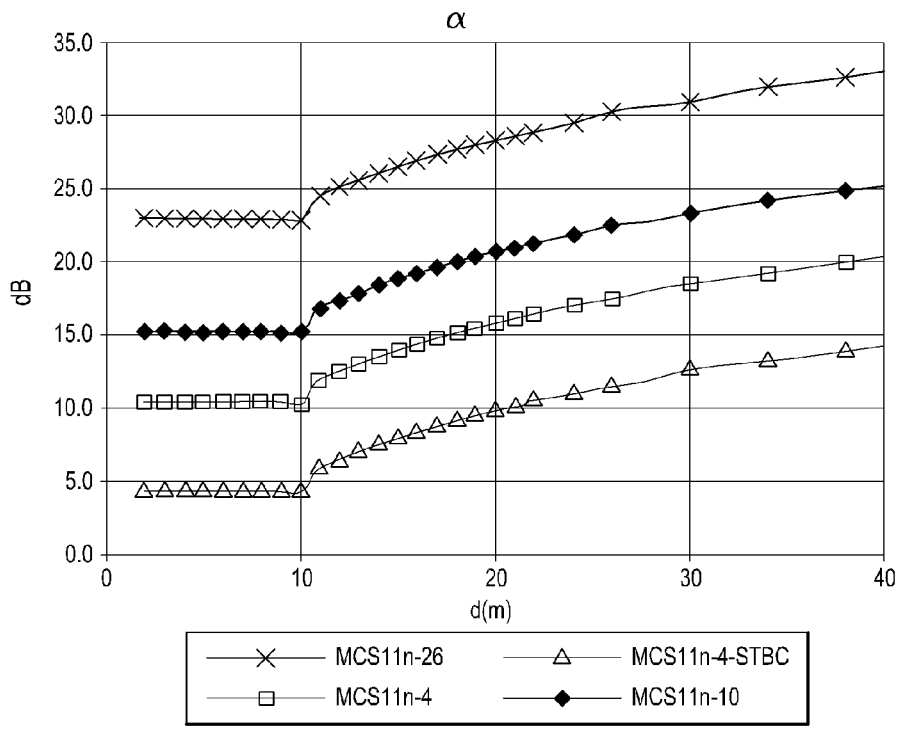
FIG. 21 shows the values of the first metric α for an 80 Mbit/s data rate as a function of the distance d for the IEEE802.11n system. For d<6m, an LOS WPAN scenario is considered, and an NLOS scenario is considered at greater range. Four transmission modes are considered: $MCS_{11n}10$, $MCS_{11n}4$, $MCS_{11n}4$-STBC, and $MCS_{11n}26$. They all implement an SDM MIMO transmission technique, with the exception of the $MCS_{11n}4$-STBC mode which implements Alamouti coding. These modes are described in detail in Appendix E. The number of transmit antennas is equal to the number of receive antennas ($N_{TX}=N_{RX}$), and the sizes of the channels and the numbers of space streams are variable.

For each of the four modes, FIG. 21 gives the values of the first metric $\alpha$ as a function of distance d.

In a first implementation, the method of an embodiment of the invention selects the transmission mode that leads to the smallest value for the first metric $\alpha$ at a transmitter-to-receiver distance d: this is the $MCS_{11n}4$-STBC mode.

In another implementation, the method of an embodiment of the invention selects the transmission mode for which the value of the first metric $\alpha$ is less than a certain threshold, e.g. 25 dB. Under such circumstances, all four modes $MCS_{11n}10$, $MCS_{11n}4$, $MCS_{11n}4$-STBC, and $MCS_{11n}26$ are selected for a distance d of less than about 6 m. For the range of distances d going from 6 m to 19 m, the three modes $MCS_{11n}10$, $MCS_{11n}4$, and $MCS_{11n}4$-STBC are selected.

The selection method of an embodiment of the invention calculates the values of the second metric $\beta$ for the selected mode $MCS_{11n}4$-STBC, or for the four modes or the three modes that are selected on the basis of the first metric X.

Figure 22:
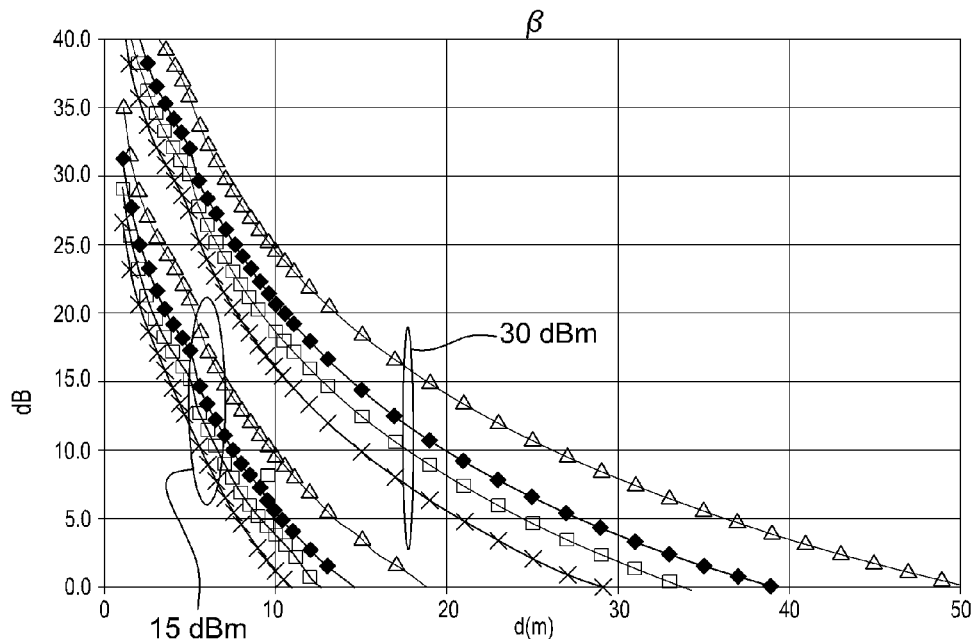
FIG. 22 shows the values of the second metric β for the four transmission modes based on the first metric α for an IEEE802.11n system.

The values of the second metric $\beta$ are shown by the curve of FIG. 22. This curve makes it possible to see that the condition $\beta > 0$ is no longer true for certain distances d beyond 10 m as a function of the various modes. This means that the power available at that distance is below the sensitivity threshold, and that consequently if the distance between the two entities exceeds that distance d, then the receiver entity is no longer in the coverage of the transmitter entity for the mode under consideration.

In the first implementation, only the $MCS_{11n}4$-STBC mode is selected. The condition $\beta > 0$ is no longer true for distances d exceeding about 20 m for an EIRP radiated power equal to 15 dBm. By increasing this radiated power from 15 dBm (EIRP=30 dBm), it is possible to increase the power available at a distance d and consequently to increase the range of the transmitter entity.

In the other implementation, all four modes $MCS_{11n}10$, $MCS_{11n}4$, $MCS_{11n}4$-STBC, and $MCS_{11n}26$ are selected for a distance d of less than about 6 m, whereas for the range of distances d extending from 6 m to 19 m, the three modes $MCS_{11n}10$, $MCS_{11n}4$, and $MCS_{11n}4$-STBC are selected.

For a distance d less than about 10 m, the condition $\beta > 0$ is true for all four modes $MCS_{11n}10$, $MCS_{11n}4$, $MCS_{11n}4$-STBC, and $MCS_{11n}26$. The selection method preferably selects the mode for which $$\beta_{min} \leq \beta \leq \beta_{max}$$

For the distance range d from 6 m to 19 m, the condition $\beta > 0$ is no longer true for distances exceeding about 15 m, 14 m, and 19 m respectively for the three modes $MCS_{11n}10$, $MCS_{11n}4$, and $MCS_{11n}4$-STBC, for an EIRP radiated power equal to 15 dBm. For a distance d lying in this range, the selection method may select a "current" mode for which $$\beta_{min} \leq \beta \leq \beta_{max}$$

and may give preference to the mode for which the value of $\beta$ is the smallest. The selection method may possibly compare the current selection with the selection made for a shorter distance d. If these selections are different, then the selection method may decide to increase the EIRP radiated power. Under such circumstances, the selection method must review the current selection as a function of the new values that are obtained for $\beta$.

The example below is an illustration of implementing a selection method of an embodiment of the invention for communications entities that are compatible with an IEEE802.11n system and with a MAGNET MC-SS system, and having the possibility of selecting six different transmission modes for a data rate D of about 80 Mbit/s:

two transmission modes associated with the MAGNET MC-SS transmission interface, which are respectively the 16-QAM 2/3 and 16-QAM 3/4 modes; and four transmission modes associated with the IEEE802.11n transmission interface which are respectively the $MCS_{11n}10$, $MCS_{11n}4$, $MCS_{11n}4$-STBC, and $MCS_{11n}26$ modes.

Figure 23:
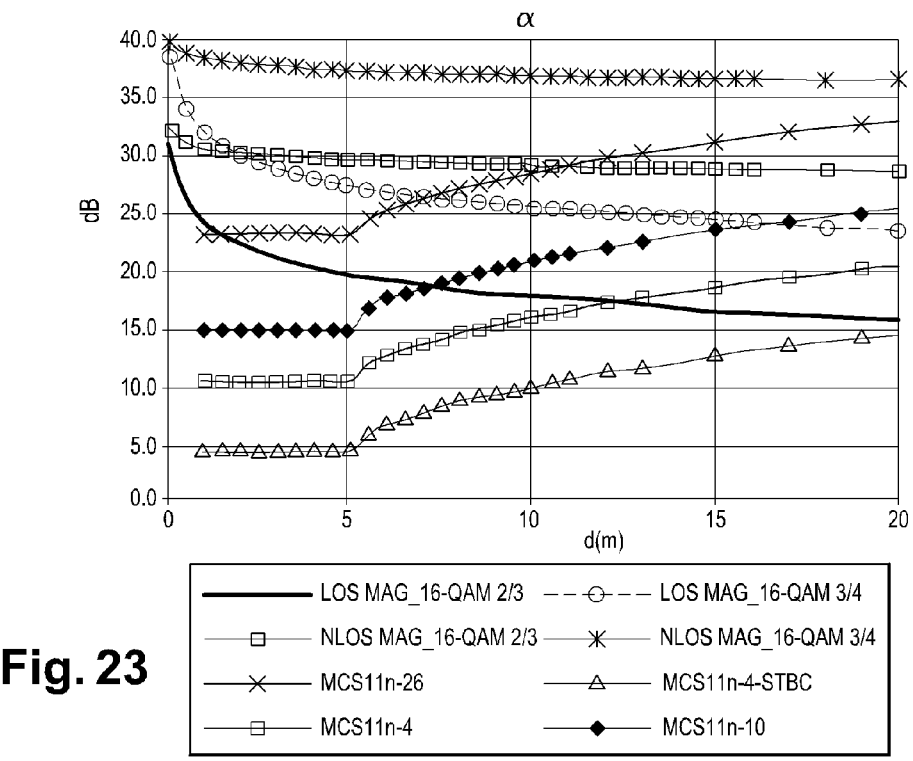
FIG. 23 shows the values of the first metric α as a function of the distance d for a data rate D=80 Mbit/s for the transmission modes of the MAGNET system defined in FIG. 19 and for the transmission modes of the IEEE802.11n system defined in FIG. 21.

FIG. 23 shows the various values of the first metric α as a function of the distance d for the various modes, which values are extracted from FIGS. 19 and 21.

In a first implementation, the method of an embodiment of the invention selects the transmission mode that leads to the smallest value for the first metric α for a transmitter-to-receiver distance d: this is the $MCS_{11n}4$-STBC mode.

TABLE A.1

| | Data rate D | | | | | |
|---|---|---|---|---|---|---|
| | 20 MHz | | | 40 MHz | | |
| Coding rate | QPSK | 16 QAM | 64 QAM | QPSK | 16 QAM | 64 QAM |
| ½ | 1.8 Nc | 3.61 Nc | 5.41 Nc | 3.61 Nc | 7.22 Nc | 10.83 Nc |
| ⅔ | 2.41 Nc | 4.81 Nc | 7.22 Nc | 4.81 Nc | 9.62 Nc | 14.44 Nc |
| ¾ | 2.71 Nc | 5.41 Nc | 8.12 Nc | 5.41 Nc | 10.83 Nc | 16.24 Nc |

TABLE A.2

| | FranceTélécom ECMA-368 models | | 5.2 GHz MAGNET (PAN-FD) models | | TG11n Channel B models | |
|---|---|---|---|---|---|---|
| Parameters | LOS | NLOS | LOS | NLOS | LOS | NLOS |
| $d_0$ | 1 | 1 | 2.5 | 2.5 | 5 | 5 |
| $f_0$ | 3.939 GHz | 3.939 GHz | 5.2 | 5.2 | 5.2 | 5.2 |
| $PL(d_0, f_0)$ | 48.9 | 54.6 | 55.97 | 62.79 | 47.41 | 47.41 |
| n | 1.62 | 3.22 | 1.34 | 1.85 | 3.5 | 3.5 |
| σ | 0 | 0 | 3.26 | 4.96 | 3 | 4 |

APPENDIX B

TABLE B.1

| | MAGNET MC-SS system Transmission mode | | |
|---|---|---|---|
| | 16-QAM ⅔ Nc/Lc = 1 | 16-QAM ¾ Nc/Lc = 1 | 64-QAM ½ Nc/Lc = 1 |
| Data rate Mb/s | 76.96 | 86.64 | 86.64 |
| Useful bandwidth MHz | 30.156 | 30.156 | 30.156 |
| SNR dB | 27 | 35 | 27 |
| NF + L0 (dB) | 6.6 + 2.5 | 6.6 + 2.5 | 6.6 + 2.5 |
| S (dBm) | −76.04 | −75.32 | −75.78 |
| $S_M$ (dBm) (BRAN-A) | −59.04 | −50.52 | −58.52 |
| MCM (dB) | 17 | 24.8 | 17.26 |

TABLE B.2

| | IEEE 802.11n system | | | |
|---|---|---|---|---|
| | $MCS_{11n}$ | | | |
| | 10 | 4 | 4 | 26 |
| | Transmission mode | | | |
| | QPSK ¾ Nss = 2 40 MHz SDM (2, 2, 2) | 16-QAM ¾ Nss = 1 40 MHz SISO (1, 1, 1) | 16-QAM ¾ Nss = 1, 40 MHz STBC (1, 2, 2) | QPSK-¾ Nss = 4 20 MHz SDM (4, 4, 4) |
| Data rate Mb/s | 81 | 81 | 81 | 78 |
| Bandwidth (MHz) | 35.9 | 35.9 | 35.9 | 20 MHz |
| SNR (dB) | 20 | 21.5 | 16 | 27.5 |
| NF + L0 (dB) | 10 + 2.5 | 10 + 2.5 | 10 + 2.5 | 10 + 2.5 |
| S (dBm) | −78.88 | −71.92 | −71.92 | −82.05 |
| SM (dBm) Channel B | −65.94 | −62.94 | −69.94 | −61.44 |
| MCM (dB) | 12.86 | 8.96 | 1.96 | 20.61 |

APPENDIX C

TABLE C.1

| | BPSK ½ | QPSK ½ | QPSK ¾ | 16-QAM ½ | 16-QAM ¾ | 64-QAM ⅔ | 64-QAM ¾ | 64-QAM ⅚ |
|---|---|---|---|---|---|---|---|---|
| $MCS_{11n}$ | 0 | 1 | 2 | 3 | 4 | 5 | 6 | 7 |

| 20 MHz, $N_{SS} = 1$, $N_{ES} = 1$ | | | | | | | | |
|---|---|---|---|---|---|---|---|---|
| Data rate | 6.5 | 13 | 19.5 | 26 | 39 | 52 | 58.5 | 65 |

| 40 MHz, $N_{SS} = 1$, $N_{ES} = 1$ | | | | | | | | |
|---|---|---|---|---|---|---|---|---|
| Modulation | BPSK ½ | QPSK ½ | QPSK ¾ | 16-QAM ½ | 16-QAM ¾ | 64-QAM ⅔ | 64-QAM ¾ | 64-QAM ⅚ |
| Useful data rate Mbit/s | 13.5 | 27 | 40.5 | 54 | 81 | 108 | 121.5 | 135 |

| 20 MHz, $N_{SS} = 2$, $N_{ES} = 1$ | | | | | | | | |
|---|---|---|---|---|---|---|---|---|
| Modulation | BPSK ½ | QPSK ½ | QPSK ¾ | 16-QAM ½ | 16-QAM ¾ | 64-QAM ⅔ | 64-QAM ¾ | 64-QAM ⅚ |
| $MCS_{11n}$ | 8 | 9 | 10 | 11 | 12 | 13 | 14 | 15 |
| Useful data rate Mbit/s | 13 | 26 | 39 | 52 | 78 | 104 | 117 | 130 |

TABLE C.1-continued

| | 40 MHz, NSS = 2, $N_{ES}$ = 1 | | | | | | | |
|---|---|---|---|---|---|---|---|---|
| Modulation | BPSK 1/2 | QPSK 1/2 | QPSK 3/4 | 16-QAM 1/2 | 16-QAM 3/4 | 64-QAM 2/3 | 64-QAM 3/4 | 64-QAM 5/6 |
| Useful data rate Mbit/s | 27 | 54 | 81 | 108 | 162 | 216 | 243 | 270 |
| $MCS_{11n}$ | 24 | 25 | 26 | 27 | 28 | 29 | 30 | 31 |

| | 20 MHz, NSS = 4, $N_{ES}$ = 1 | | | | | | | |
|---|---|---|---|---|---|---|---|---|
| Modulation | BPSK 1/2 | QPSK 1/2 | QPSK 3/4 | 16-QAM 1/2 | 16-QAM 3/4 | 64-QAM 2/3 | 64-QAM 3/4 | 64-QAM 5/6 |
| Useful data rate Mbit/s | 26 | 52 | 78 | 104 | 156 | 208 | 234 | 260 |

| | 40 MHz, NSS = 4, $N_{ES}$ = 1 | | | | | | | |
|---|---|---|---|---|---|---|---|---|
| Modulation | BPSK 1/2 | QPSK 1/2 | QPSK 3/4 | 16-QAM 1/2 | 16-QAM 3/4 | 64-QAM 2/3 | 64-QAM 3/4 | 64-QAM 5/6 |
| Useful data rate Mbit/s | 54 | 108 | 162 | 216 | 324 | 432 | 486 | 540 |

Although the present disclosure has been described with reference to one or more examples, workers skilled in the art will recognize that changes may be made in form and detail without departing from the scope of the disclosure and/or the appended claims.

The invention claimed is:

1. A method comprising:
selecting a transmission mode, for a first telecommunications entity having a plurality of different modes for transmitting a communications signal to a second telecommunications entity, the various transmission modes providing the same data rate D and being associated with one or several transmission interfaces, wherein selecting comprises:
for a given transmission mode, determining the value of a first metric $\alpha$ that evaluates a relative degradation relating to a given distance d stemming from a transmission medium of the communications signal for a given environment compared with a reference model of the transmission medium, as a result of a weighted sum of a multi-path channel margin corresponding to a relative degradation associated with a multi-path effect and of a narrow band channel margin corresponding to a relative degradation associated with an attenuation effect of the transmission medium on the transmitted signal; and
comparing values of the first metric $\alpha$ for different modes in order to select at least one transmission mode.

2. The method according to claim 1, wherein the relative degradation associated with the multi-path effect is determined by taking the difference between a multi-path sensitivity threshold of the transmission mode and a sensitivity threshold of the transmission mode, the sensitivity threshold corresponding to a minimum power required for ensuring a data rate D with a target binary error rate representative of quality of service for a Gaussian transmission medium.

3. The method according to claim 1, further comprising, for the selected transmission modes:
determining the value of a second metric $\beta$ that evaluates non-normalized excess power available at the distance d, i.e. the difference between available power at distance d and required minimum power; and selecting a transmission mode for which the second metric $\beta$ exceeds a given threshold.

4. The method of claim 3, further comprising repeating the method for different distances.

5. The method according to claim 3, wherein the second metric $\beta$ is calculated using the following equation:

$$\beta = Gr + EIRP - \alpha - S - PL_{FS}(d)$$

where EIRP is a radiated power output by a transmit antenna of the first telecommunications entity, Gr is a gain of a receive antenna, S is a minimum power required for ensuring the data rate D with a given quality of service for a Gaussian channel, and $PL_{FS}(d)$ is propagation attenuation in free space.

6. The method according to claim 1, the method further comprising transmitting a dedicated preamble frame that comprises sequences dedicated to estimating the transmission medium for at least two different transmission modes.

7. The method according to claim 3, further including updating the values of the first and second metrics $\alpha$, $\beta$ from an estimate of the transmission medium performed on the data transmitted by the communications signal between these two entities.

8. The method according to claim 7, a transmission mode being associated with a transmission interface, the method further comprising:
triggering a step of sending a dedicated preamble frame comprising sequences dedicated to estimating the transmission medium for at least two transmission interfaces of the system as soon as the updated value of the first metric $\alpha$ departs from a given range $$\alpha_{min} < \alpha_j < \alpha_{max}$$

and the mode selected from the updated second metric $\beta$ is associated with a transmission interface distinct from that associated with the previously selected mode.

9. A communications entity comprising:
   at least two different transmission modes;
   a determination module configured to act for a given transmission mode to determine the value of a first metric $\alpha$ that evaluates a relative degradation relating to a given distance d stemming from a transmission medium of the communications signal for a given environment compared with a reference model of the transmission medium, as a result of a weighted sum of a multi-path channel margin corresponding to a relative degradation associated with a multi-path effect and of a narrow band channel margin corresponding to a relative degradation associated with an attenuation effect of the transmission medium on the transmitted signal; and
   a comparison module configured to compare the values of the metric for different modes in order to select at least one transmission mode.

10. A communications entity according to claim 9, further comprising a plurality of transmission interfaces, the transmission modes being associated with one of the transmission interfaces, wherein the transmission interfaces belong to a group comprising:
   an interface of the power line transmission (PLT) type;
   an interface of the radio frequency (RF) type; and
   an interface of the optical type.

11. A telecommunications system including a communications entity according to claim 9.

12. A non-transitory data medium comprising a computer program stored thereon, said program including program instructions adapted to a transmission mode selection method when said program is loaded and executed in a first telecommunications entity, wherein the method comprises:
   selecting a transmission mode, for the first telecommunications entity, which has a plurality of different modes for transmitting a communications signal to a second telecommunications entity, the various transmission modes providing the same data rate D and being associated with one or several transmission interfaces, wherein selecting comprises:
   for a given transmission mode, determining the value of a first metric $\alpha$ that evaluates a relative degradation to a given distance d stemming from a transmission medium of the communications signal for a given environment compared with a reference model of the transmission medium, as a result of a weighted sum of a multi-path channel margin corresponding to a relative degradation associated with a multi-path effect and of a narrow band channel margin corresponding to a relative degradation associated with an attenuation effect of the transmission medium on the transmitted signal; and
   comparing values of the first metric a for different modes in order to select at least one transmission mode.

13. The method according to claim 1, wherein the relative degradation associated with the attenuation effect is determined by the additional attenuation obtained for an attenuation model in obstructed space compared with that obtained for a reference attenuation model in free space.

* * * * *